US012761139B2

(12) United States Patent
Siciliani De Cumis et al.

(10) Patent No.: US 12,761,139 B2
(45) Date of Patent: Oct. 13, 2026

(54) PHOTOACOUSTIC SPECTROSCOPY SENSOR FOR TRACE GAS DETECTION AND METHOD FOR TRACE GAS DETECTION

(71) Applicants: CONSIGLIO NAZIONALE DELLE RICERCHE, Rome (IT); A.S.I. AGENZIA SPAZIALE ITALIANA, Rome (IT)

(72) Inventors: Mario Siciliani De Cumis, Catanzaro (IT); Simone Borri, Rome (IT); Mariaconcetta Canino, Rome (IT); Pablo Cancio Pastor, Rome (IT); Paolo De Natale, Rome (IT); Inaki Lopez Garcia, Rome (IT); Alberto Roncaglia, Rome (IT)

(73) Assignees: CONSIGLIO NAZIONALE DELLE RICERCHE, Rome (IT); A.S.I. AGENZIA SPAZIALE ITALIANA, Rome (IT)

( * ) Notice: Subject to any disclaimer, the term of this patent is extended or adjusted under 35 U.S.C. 154(b) by 316 days.

(21) Appl. No.: 18/723,954

(22) PCT Filed: Dec. 28, 2022

(86) PCT No.: PCT/EP2022/087976

§ 371 (c)(1),
(2) Date: Jun. 25, 2024

(87) PCT Pub. No.: WO2023/126455

PCT Pub. Date: Jul. 6, 2023

(65) Prior Publication Data

US 2025/0060306 A1 Feb. 20, 2025

(51) Int. Cl.
*G01N 21/17* (2006.01)

(52) U.S. Cl.
CPC . *G01N 21/1702* (2013.01); *G01N 2021/1704* (2013.01); *G01N 2201/06113* (2013.01)

(58) Field of Classification Search
CPC . G01N 21/17; G01N 21/1702; G01N 21/1704
See application file for complete search history.

(56) References Cited

U.S. PATENT DOCUMENTS 6,407,848 B1 * 6/2002 Bablumyan ............. G01J 3/453 359/305
6,885,458 B2 * 4/2005 Borden .............. G01N 21/1717 356/502

(Continued)

FOREIGN PATENT DOCUMENTS

EP 0339625 A1 11/1989
GB 2492841 A 1/2013

OTHER PUBLICATIONS

Chu J H et al: "Michelson interferometric detection for optoacoustic spectroscopy" Optics Communications, Elsevier, Amsterdam, NL, vol. 89, No. 2-4, May 1, 1992 (May 1, 1992), pp. 135-139, XP025490384, ISSN: 0030-4018, DOI: 10.1016/0030-4018 (92) 90146-1.

(Continued)

*Primary Examiner* — Herbert K Roberts
(74) *Attorney, Agent, or Firm* — Carmel Patent Agency; Robert Ballarini

(57) ABSTRACT

A photoacoustic sensor for spectroscopic gas detection includes a chamber to contain the gas; an excitation laser source that emits a modulated laser beam; a transducer, having a reflective portion, located inside the chamber; an interferometer having first and second arms and an output, the first arm ending in the transducer, and the second arm including an optical path changer element and an actuator connected to the optical path changer element to change the optical path defined by the second arm of the interferometer;

(Continued)

a first polarizing beam splitter; a second laser source; a second polarizing beam splitter; a first detector; a second detector; an electronic circuit; and a feedback loop adapted to command the movements of the actuator in order to change and stabilize the optical path of the second arm, so that the difference signal is kept equal to a desired constant value during the gas concentration measurements.

11 Claims, 15 Drawing Sheets

(56) References Cited

U.S. PATENT DOCUMENTS

| | | | | |
|---|---|---|---|---|
| 7,738,116 | B2 | 6/2010 | Kauppinen | |
| 9,170,397 | B2 | 10/2015 | Kauppinen | |
| 10,895,528 | B2 | 1/2021 | Mazzotti et al. | |
| 12,222,280 | B1 * | 2/2025 | Chen | G01N 29/2418 |
| 2011/0261437 | A1 * | 10/2011 | Chen | H04B 10/677 359/325 |
| 2019/0257796 | A1 * | 8/2019 | Duraffourg | G01N 21/1702 |
| 2025/0130161 | A1 * | 4/2025 | Waclawek | G01N 21/1717 |

OTHER PUBLICATIONS

Siciliani De Cumis Mario et al: "A compact cantilever-based photoacoustic sensor for trace-gas detection", S P I E Proceedings; [Proceedings of S P I E ISSN 0277-786X], SPIE, US, vol. 11288, Jan. 31, 2020 (Jan. 31, 2020), pp. 112882E-112882E.

Hernandez Carmen M et al: "Photoacoustic 1, 6 characterization of the mechanical properties of thin films", Applied Physics Letters, American Institute of Physics, 2 Huntington Quadrangle, Melville, NY 11747, vol. 80, No. 4, Jan. 28, 2002 (Jan. 28, 2002), pp. 691-693.

V. Spagnolo, P. Patimisco, S. Borri, G. Scamarcio, B. E. Bernacki, and J. Kriesel: "Part-per-trillion level SF6 detection using a quartz enhanced photoacoustic spectroscopy-based sensor with single-mode fiber-coupled quantum cascade laser excitation" Opt. Lett. 37, 4461-4463 (2012).

T. Tomberg, M. Vainio, T. Hieta and L. Halonen: "Sub-parts-per-trillion level sensitivity in trace gas detection by cantilever-enhanced photo-acoustic spectroscopy" Scientific Reports | (2018) 8:1848.

International Search Report of PCT/EP2022/087976, dated Feb. 3, 2023.

* cited by examiner

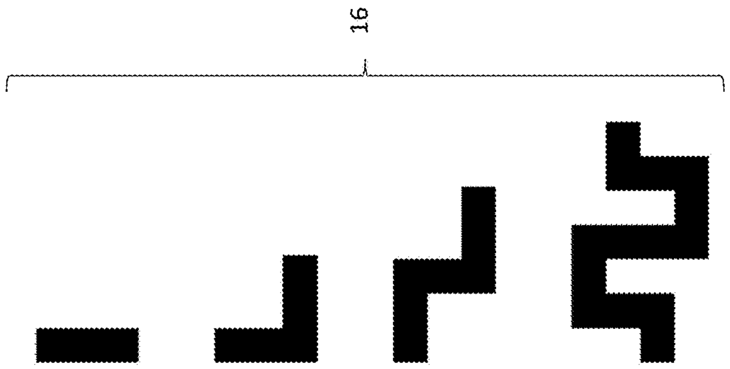
FIG. 11
FIG. 12
FIG. 13
FIG. 14
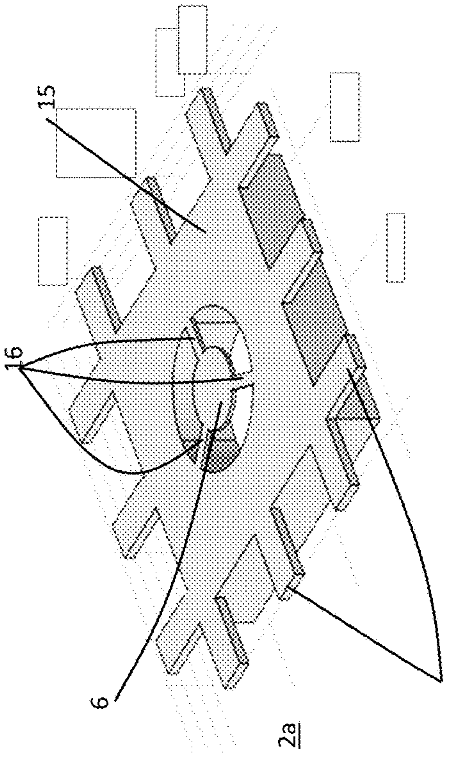
FIG. 9
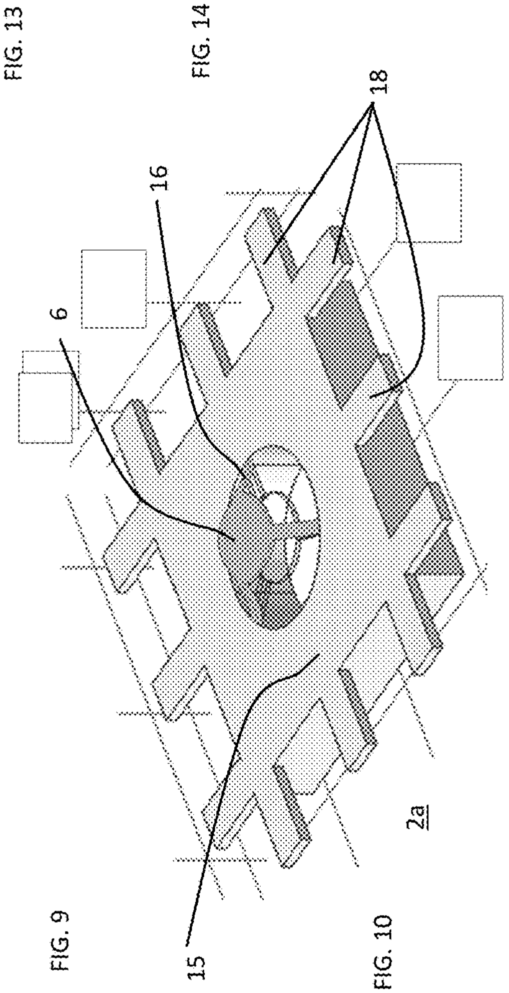
FIG. 10

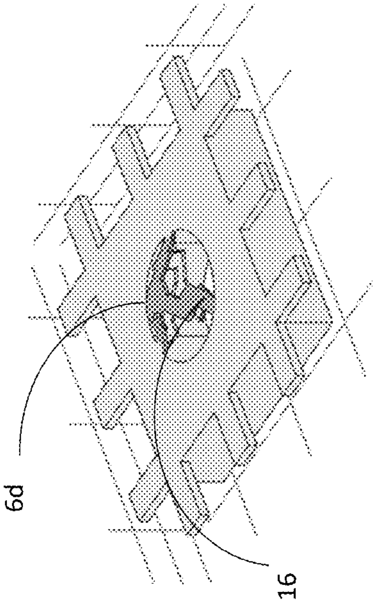
FIG. 23
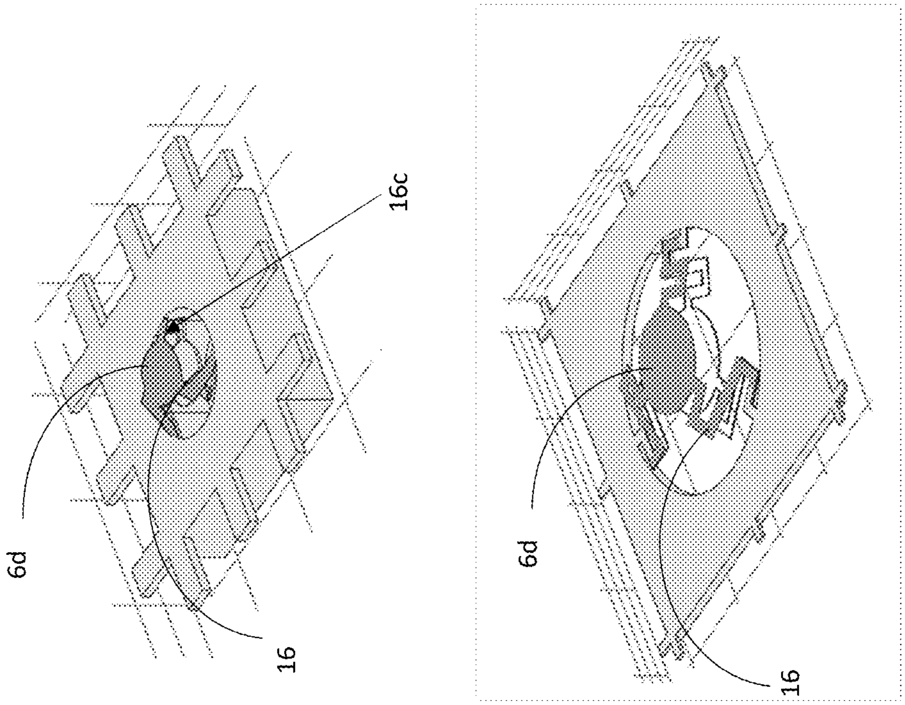

FIG. 25b
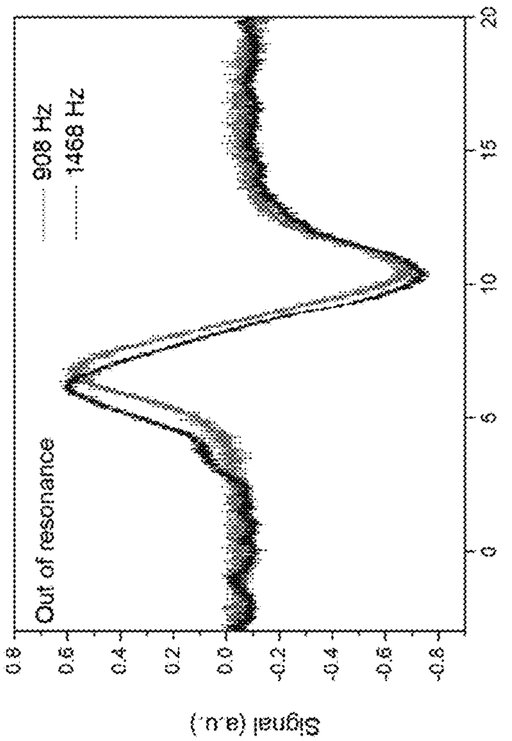
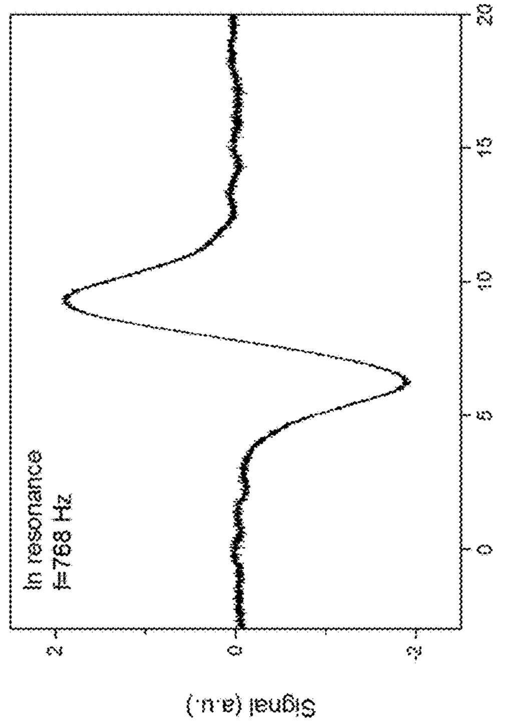
FIG. 25a

PHOTOACOUSTIC SPECTROSCOPY SENSOR FOR TRACE GAS DETECTION AND METHOD FOR TRACE GAS DETECTION

The present invention relates to a photoacoustic sensor to detect traces of selected molecular species in a gas. Furthermore, the invention relates to a method to detect traces of a gas using a photoacoustic phenomenon.

In molecular trace gas analysis, researchers are constantly pushing towards more sensitive, affordable and robust instruments as required by the industry and the scientific community. For example, the SCAR technique has been developed, described in WO 2017/055606, which achieves few parts per quadrillion-ppq ($10^{-15}$) record sensitivities. However, such accurate measurements are possible at the expense of a relatively high cost, a limited portability and highly sophisticated components. Modern photo-acoustic spectroscopic (PAS) techniques, such as cantilever-enhanced photo-acoustic spectroscopy (CEPAS), quartz-enhanced photo-acoustic spectroscopy (QEPAS) and variants of cavity-enhanced photo-acoustic spectroscopy are also techniques known in the art which can achieve high sensitivities. For example, for the standard QEPAS sensor sensitivity of 50 parts per trillion-ppt ($10^{-12}$) on $SF_6$ has been obtained, as described in V. Spagnolo, P. Patimisco, S. Borri, G. Scamarcio, B. E. Bernacki, and J. Kriesel, Opt. Lett. 37, 4461 (2012) with cost-effective elements, non-critical optical alignment, and possibility of fabricating very compact systems. Furthermore, this technique is suitable for several implementations, which can improve its performance. Commercial sensors are available, as produced by companies like Thorlabs.

The CEPAS sensors developed so far present an almost unique design of the cantiveler (rectangular shape) and of the detection scheme, using a standard interferometric reading. The variants on which research groups have worked concern the design of the acoustic cell and the cantilever support. These sensors are commercialized by the Finnish company GASERA, and some aspects of the sensors are described for example in U.S. Pat. Nos. 7,738,116 and 9,170,397.

Recently, a CEPAS sensor has demonstrated sub-ppt detection on HF in T. Tomberg, M. Vainio, T. Hieta and L. Halonen, Sci. Rep. 8, 1848 (2018), though obtained with the use of a very complex high power optical source (Optical Parametric Oscillator). However, this result demonstrates the high potential of both the CEPAS technique and its possible implementations.

An example of a Michelson interferometeric optophone is described in the document CHU J H ET AL: “Michelson interferometric detection for optoacoustic spectroscopy”, OPTICS COMMUNICATIONS, ELSEVIER, AMSTERDAM, NL, vol. 89, no. 2-4, 1 May 1992 (1992 May 1), pages 135-139.

The present invention relates to a photoacoustic sensor and a method to detect gas traces that achieve a relatively high sensitivity. In particular, the sensor and the method of the invention allows solving—at least partially—some of the instability problems over time (drifts) of the sensor. Furthermore, the sensor and the method of the invention allow averaging the signal obtained by the measurements over longer timescales, improving sensitivity and avoiding systematic effects in the determination of the concentration of the trace species in the gas sample.

According to a first aspect, the invention relates to a photoacoustic sensor for spectroscopic gas detection, comprising:

A chamber adapted to contain the gas to be analysed;

An excitation laser source adapted to emit a frequency- or amplitude-modulated laser beam, which is absorbed by the gas present in the chamber and creating a pressure wave;

A transducer, the transducer being located inside the chamber, and being adapted to be put into oscillations by the pressure wave, the transducer having a reflective portion;

An interferometer having a first and a second arm and an output, with the first arm ending in the transducer, and the second arm including an optical path changer element and an actuator connected to the optical path changer element to change the optical path defined by the second arm of the interferometer;

A first polarizing beam splitter;

A second laser source for interferometer reading, adapted to emit a second laser beam impinging onto the first polarizing beam splitter, the first polarizing beam splitter being adapted to split the second laser beam in the first and the second arm of the interferometer, so that the split beam travelling in the first arm is back-reflected by the reflective portion of the transducer, and the split beam travelling in the second arm is back-reflected by the optical path changer element, so that the resulting back-reflected split beams interfere in the interferometer;

A second polarizing beam splitter adapted to split the interfering light at the output of the interferometer in two beams which are orthogonally polarized;

A first detector adapted to detect one of the two orthogonally polarized beam exiting the interferometer and to emit a corresponding first interference signal;

A second detector adapted to detect the other of the two orthogonally polarized beam exiting the interferometer and to emit a corresponding second interference signal;

An electronic circuit configured to obtain a difference signal, the difference signal being function of the difference between the signal generated by the first detector and the signal generated by the second detector;

A feedback loop adapted to command the movements of the actuator in order to change the optical path of the second arm, so that the difference signal is kept equal to a desired constant value during the gas concentration measurements.

According to a different aspect, the invention relates to a method to detect a gas concentration by means of a photoacoustic phenomenon, the method comprising:

Providing a chamber where a gas is located, the concentration of which is to be measured;

Providing a transducer in the chamber, the transducer comprising a reflective portion;

Generating a pressure wave in the chamber by means of a modulated excitation laser beam directed into the chamber, according to the photo-acoustic phenomenon, the pressure wave putting the transducer in oscillation;

Impinging with a second laser beam onto the reflective portion of the transducer;

providing an interferometer, having a first arm terminating into the transducer and a second arm terminating into an optical path changer element adapted to vary the path length of the second arm;

Directing a second laser beam towards the interferometer, the second laser beam forming a first back-reflected beam when reflected by the transducer and a second back reflected beam when reflected by the optical path changer element;

Creating an interference between the first and the second back-reflected beams;

Splitting the interfering back-reflected beams in a first and a second interference beam;

Polarizing the first and/or the second interference beam so that their polarization axes are mutually perpendicular;

Detecting the first interference beam and the second interference beam generating a first and a second signal;

generating a difference signal function of the difference between the first signal and the second signal;

Defining a working point value of the difference signal;

Adapting the optical path length of the second arm actuating the actuator so that the difference signal is kept equal to the working point value during the gas concentration measurement.

According to an embodiment of the invention, a different device able to control the interferometer optical path can be substituted to the actuators, e.g. a liquid crystal or electro-optic element or any device able to change the phase of the radiation.

It should be noted that the feature of “the second detector adapted to detect the other of the two orthogonally polarized beam exiting the interferometer and to emit a corresponding second interference signal” represents a differential detection scheme, centered on the zero, that is obtained when the two beams have perfectly orthogonal polarization. Any unbalance in polarization gives a nonzero signal.

According to an embodiment of the invention, the feedback look is made of an electronic circuit taking the difference signal, comparing it to a desired fixed value, and producing an error signal to be sent to the actuator.

According to an embodiment of the invention, the step of “defining a working point value of the difference signal” provides for setting the working point value to zero.

In the invention, the sensor and the method are used to detect the gas concentration in the gas chamber. A gas, called gas sample, is located in the gas chamber, normally containing different molecular species, and the purpose of the invention is to measure the concentration of one or more target molecules eventually present in the gas sample in traces. Therefore with “measuring the gas concentration”, measuring a specific (target) molecular species among the species present in the gas sample is meant. In addition, some gaseous promoters (e.g. water vapor) may be added, in a known concentration, to the gas sample to be analyzed, in order to enhance the photoacoustic effect.

The gas chamber defines an air-tight enclosure. It can be made of any material suitable in the art. The gas chamber can be used in flow or in static gas conditions.

Furthermore, a first laser source, called excitation laser source, is provided. The first laser source is adapted to emit a first laser beam. Preferably, the first laser source emits a first laser beam. Preferably, the first laser beam is in the infrared (IR) range. The wavelength of the IR beam is selected so that it resonates with roto-vibrational molecular transitions. The infrared beam is an electromagnetic beam having a wavelength in the range 700 nm (frequency 430 THz)-1 mm (300 GHz). However, any other wavelength, that is resonant with rotational, vibrational, electronic transitions, alone or in combination and exploiting overtones, can be used, if radiation absorption is sufficiently intense to generate detectable acoustic waves.

The first laser source may be located inside the gas chamber, or it may be external to the same. If the first laser source is located outside the gas chamber, a window is preferably present in the gas chamber, which is substantially transparent for the first laser beam, so that this laser beam can pass through the window and reach the inner part of the chamber.

The wavelength of the first laser beam is so selected that it can interact with the target molecules present in the gas of the gas sample. In particular, the wavelength is selected in a way that it excites a molecular transition in the molecules of the gas to be analysed inside the gas chamber. The first laser beam is thus selected so that it is resonant with a selected molecular transition of the gas, the concentration of which is to be measured. Furthermore, the first laser beam is a modulated laser beam. The first laser is (frequency or amplitude) modulated at a frequency f, so that it excites the transition, and the subsequent molecular relaxation produces an acoustic wave.

The infrared laser beam, absorbed by the gas to be analysed, generates heat waves, which result in pressure fluctuations within the gas chamber, substantially forming pressure waves in the chamber. This process is a very well known phenomenon and therefore no further detailed in the following.

Preferably, the pressure inside the chamber is comprised between 1 mbar and atmospheric pressure, more preferably above 10 mbar.

Furthermore, in the gas chamber a transducer is located. The transducer may be connected to a substrate. The substrate may be a silicon wafer. The substrate may be internal or external to the gas chamber. The transducer extends into the gas chamber, that is, it is subject to the pressure wave which develops due to the excitation laser beam. The substrate is then connected, for example by means of a support, to the gas chamber.

According to the invention, the transducer comprises a main component which is adapted to be put into oscillations by a pressure wave. The main component comprises a reflective element with at least a reflective portion forming a mirror of the interferometer.

Preferably, the reflective element defines a triangular surface, a rectangular surface or a squared surface.

Preferably, the reflective element defines a regular polygonal surface or an irregular polygonal surface.

Preferably, the reflective element defines a circular surface or an oval surface.

Preferably, the reflective element is thin compared to the substrate, i.e. the reflective element has a maximum thickness of tens of microns whereas the substrate has a maximum thickness of hundreds of microns.

According to an embodiment of the invention, the reflective element is directly connected (i.e. without other elements) to the chamber, in particular to the substrate. In this case, the main component may be considered as a self-supporting member.

Preferably, the main component, in particular the reflective element, is a membrane or an equivalent structure.

According to another embodiment of the invention, the main component comprises a first suspension structure between the reflective element and the chamber, in particular the substrate. The first suspension structure is made of one or more elongated elements having two opposite longitudinal ends connected to the reflective element and the chamber (in particular the substrate), respectively. Therefore, the reflective element is connected to the chamber (in particular to the substrate) via the first suspension structure. The first suspension structure supports the reflective element and allows the main component to oscillate. In should be noted that at least one of the number, size and shape of elongated elements of the first suspension structure determines the mechanical resonance spectrum of the main component. For instance, the elongated element of the first suspension structure may have shape of one of beam, arc, L, S, Z and spiral or combination thereof.

Preferably first suspension structure is arranged so that it have no optical function for the photoacoustic sensor.

In addition to the first suspension structure, the transducer may comprise a damping and insulation structure between the first suspension structure and the chamber, in particular the substrate. In this case, a longitudinal end of each elongated element of the first suspension structure is connected to the main component and the other one of each elongated element is connected to damping and insulation structure. Therefore, the main component is connected to the chamber (in particular to the substrate) via the damping and insulation structure. It should be noted that a purpose of the damping and insulation structure is to filter the ambient noise during the use of the photoacoustic sensor.

Preferably, the damping and insulation structure at least partially surrounds the main component. The damping and insulation structure can surround the main component in a symmetrical or asymmetrical way.

Preferably, the mass of the damping and insulation structure is ten times greater than the mass of the main component.

Preferably, the mass and/or size and/or shape of the damping and insulation structure allows to filter out selected frequency components. Moreover, the mechanical modes of the damping and insulation structure do not overlap the modes of the main component nor the working frequency of the photoacoustic sensor (if different).

Preferably, the damping and insulation structure is arranged so that it has no optical function for the photoacoustic sensor.

In addition to the damping and insulation structure, the transducer may comprise a second suspension structure between the damping and insulation structure and the chamber, in particular the substrate. The second suspension structure is made of one or more elongated elements having two opposite longitudinal ends connected to the damping and insulation structure and the chamber (in particular the substrate), respectively. Therefore, the main member is connected to the damping and insulation structure, the latter being connected to the chamber (in particular to the substrate) via the second suspension structure. The second suspension structure supports the damping and insulation structure.

Preferably, the second suspension structure is designed in such a way that the transmission of mechanical frequencies interfering with the working mode of the main component are minimized. For instance, the elongated element of the second suspension structure may have shape of one of beam, arc, L, S, Z and spiral or combination thereof.

Preferably, the second suspension structure is arranged so that they have no optical function for the photoacoustic sensor.

According to another embodiment of the invention, the main component lacks of the first suspension structure and the reflective element is directly connected to the damping and insulation structure which is connected to the chamber, in particular to the substrate. In this case, the transducer may also comprise the second suspension structure so that the damping and insulation structure is connected to the chamber (in particular to the substrate) via the second suspension structure.

The transducer is preferably a microelectromechanical system (MEMS) transducer. MEMS are also referred to as micromachines or microsystem technology (MST). MEMS transducers preferably range in size from 10 μm to a couple of centimeters. With "size", the maximum dimension of the MEMS is meant.

As mentioned, the transducer may be attached to a substrate. The attachment may be a single-point attachment, that is, there is a single connection between the substrate and the MEMS transducer, or multiple-points attachments, where there are multiple connections. The number of connections may be chosen depending on the geometry of the transducer.

Preferably, the transducer has a geometry such that two of its dimensions are much bigger than its third dimension. That is, generally the thickness of the transducer is much smaller than its length or width.

Preferably, three main types of transducer may be considered.

The first type of transducer refers to a transducer whose reflective element is a membrane. The membrane performs a movement similar to the movement of a drum. This is achieved due to a connection between the membrane and the substrate which is symmetrical to an axis. In other words, the membrane has a symmetry axis and the connections between the membrane and the support are symmetric with respect to this axis. This means that a membrane always includes at least two connections between itself and the substrate. The membrane may define a triangular surface, a rectangular or squared surface, it may define a regular or an irregular polygonal surface (preferably, the regular or irregular polygon has a number of sides comprised between 3 and 20), it may define a circular or an oval surface. The thickness of the membrane is preferably comprised between 30 nm and 50 micrometres. Preferably, the thickness depends on the material in which the membrane is formed. The maximum lateral dimension is preferably comprised between 100 micrometres and 2 cm.

With maximum transverse dimension, the maximum dimension of the side of a rectangle circumscribed to the membrane is meant.

Preferred membranes geometries and materials are listed in TABLE 1.

TABLE 1

| Material | Further details | Thickness | Maximum transverse dimension | Frequencies of oscillation |
|---|---|---|---|---|
| Silicon | polysilicon, crystalline silicon (crystal directions: 100, 110, 111) | 200 nm-30 micron | 100 micron-15 mm | 10 Hz-500 kHz |

TABLE 1-continued

| Material | Further details | Thickness | Maximum transverse dimension | Frequencies of oscillation |
|---|---|---|---|---|
| Silicon nitride | Stoichiometric or Non-stoichiometric compound | 10 nm-2 micron | 100 micron-10 mm | 100 Hz-1 MHz |
| Silicon oxide | Stoichiometric or Non-stoichiometric compound | 50 nm-2 micron | 100 micron-10 mm | 350 Hz-250 kHz |
| Multilayer $SiO_2 + Si_3N_4$ | Stoichiometric or Non-stoichiometric compound | 10 nm-2 micron | 100 micron-10 mm | 250 Hz-350 kHz |
| SiC − 3C | | 10 nm-10 micron | 100 micron-10 mm | 350 Hz-250 kHz |
| SU8 | | 50 nm-30 micron | 100 micron-10 mm | 250 Hz-200 kHz |
| Indium Tin Oxide (ITO) | | 10 nm-500 nm | 100 micron-10 mm | 250 Hz-150 kHz |

The second type of transducer refers to a transducer whose main component comprises a first suspension structure between the reflective element and the substrate. In this case, the reflective element may be described as a central element (triangular, rectangular, regular or irregular polygons—side numbers between 3 and 20—circles). Differently from the membranes, however, the reflective element is connected to the substrate asymmetrically. The transducer can oscillate therefore "anchored on one side". Also in this case multiple connections may be present between the reflective element and the first suspension structure. The number of connections is preferably comprised between 1 and 20. In particular, the connections between the reflective element and the first suspension structure correspond to the connections between the reflective element and the elongated elements of the first suspension structure.

The shape of the elongated elements of the first suspension structure may be of 4 types:

right rectangular beams, in this case it is therefore said that there is a single element forming the elongated element;

L-shape (composition of two perpendicular elements);

Z-shape (composition of three elements perpendicular to two by two);

S-shape (composition of at least two z-shape elongated elements).

Preferred geometries and materials of the elongated elements are listed in TABLE 2.

TABLE 2

| Material | Further details | Thickness | Maximum transverse dimension | Number of elongated elements | Maximum convex hull dimension of an elongated element | Oscillation frequencies |
|---|---|---|---|---|---|---|
| Silicon | polysilicon, crystalline silicon (crystal directions: 100, 110, 111) | 200 nm-30 micron | 100 micron-15 mm | 1-20 | 100 micron-10 mm | 10 Hz-900 kHz |
| SiC - 3 C | | 10 nm-2 micron | 100 micron-10 mm | 1-20 | 100 micron-10 mm | 350 Hz-250 kHz |
| SU8 | | 50 nm-30 micron | 100 micron-10 mm | 1-20 | 100 micron-10 mm | 250 Hz-150 kHz |
| SU8 + Si/ $Si_3N_4/SiO_2$ | Silicon, silicon oxide, silcion nitride | 50 nm-20 micron | 100 micron-10 mm | 1-20 | 100 micron-10 mm | 400 Hz-750 kHz |

The third type of transducer refers to a transducer whose main component comprises a first suspension structure between the reflective element and the substrate. Different from the second type-transducer, the first suspension structure has a spiral like shape. The spiral is formed by a plurality of elements connected to each other in series (that is, one after the other). The reflective element is connected to the spiral and forms a central element of the transducer. The central element can have any shape, the same shape detailed when it comes to the membrane.

In this case, the first suspension structure is a composition of bar-like elements with a relative angle between 15 and 179 degrees. The first suspension structure creates "loops" around the central element.

Preferred first suspension structure geometries and materials are listed in TABLE 3.

TABLE 3

| Material | Further details | Thickness | Maximum transverse dimension | Number of elements | Number of loops | Oscillation frequencies |
|---|---|---|---|---|---|---|
| Silicon | polysilicon, crystalline silicon (crystal directions: 100, 110, 111) | 200 nm-30 micron | 100 micron-15 mm | 1-20 | 0.05-3 | 10 Hz-500 kHz |
| SiC - 3 C | | 10 nm-2 micron | 100 micron-10 mm | 1-20 | 0.05-3 | 350 Hz-250 kHz |
| SU8 | | 50 nm-30 micron | 100 micron-10 mm | 1-20 | 0.05-3 | 250 Hz-150 kHz |
| SU8 + Si/$Si_3N_4/SiO_2$ | Silicon, silicon oxide, silcion nitride | 50 nm-20 micron | 100 micron-10 mm | 1-20 | 0.05-3 | 400 Hz-400 kHz |

The pressure wave caused by the excitation of the molecular transition and propagating in the chamber forces the transducer to oscillate. The transducer is thus put into motion by the propagating pressure wave in the chamber. The motions are oscillations.

The frequency of the oscillations of the transducer depends on the modulation frequency of the first laser, the laser that excites the gas molecular transition. The amplitude of the oscillations depend on many factors, including the power of the exciting laser, the modulation depth of the first laser, the gas pressure, the target molecule concentration, the cross section of the selected molecular transition, the presence of gas promoters or interfering molecules. Due to the fact that all these parameters are known, with the exception of the concentration of the target molecules in the gas, the amplitude of the oscillations of the transducer is measured and from it the concentration is derived.

The amplitude of the photoacoustic wave is given by $$S = K \cdot P \cdot \sigma \cdot n \tag{1}$$

where K is a constant depending on the transducer geometry, material and dimension, chamber geometry, and modulation frequency, P is the optical power of the excitation laser source, σ is the absorption cross-section of the measured transition, and n is the density number of absorbing molecules (proportional to their concentration). The constant K is usually defined by calibration, and depends on the shape of the cell and on the modulation frequency f of the (first) excitation laser:

$$K \propto \frac{1}{f}$$

The acoustic wave forces the transducer to oscillate, at the same frequency f and with and amplitude which is proportional to S. The acoustic wave can eventually excite also higher-order resonances. The amplitude of the acoustic wave carries the information about the concentration of the target molecules. This information is transferred to the transducer, specifically to its oscillation amplitude, and can be detected interferometrically.

In order to measure such amplitude, the transducer comprises, at least partially, a reflective portion. The reflective portion is reflective for electromagnetic radiation with the features described below. The transducer can be, for example, at least partly, coated by a reflective material or be formed, at least partly, by a reflective material.

Coating materials depend on He—Ne laser (or equivalent) wavelength, transducer material and gas sample. Possible materials are for example one or more of gold, aluminum, silver, dielectric multilayers, polymers and metal oxides.

In order to measure the oscillations of the transducer, an interferometer is provided. The interferometer is part of the sensor. Thanks to the reflecting surface, the transducer forms one of the mirrors of the interferometer.

Interferometry makes use of the principle of superposition to combine waves in a way that will cause the result of their combination to have some meaningful property that provides information on the original state of the waves and on the path/length travelled. This works because when two waves with the same frequency combine, the resulting intensity pattern is determined by the phase difference between the two waves-waves that are in phase will undergo constructive interference while waves that are out of phase will undergo destructive interference. Waves which are not completely in phase nor completely out of phase will have an intermediate intensity pattern, which can be used to determine their relative phase difference.

In order to obtain interferometric data, a second laser source is provided, called also "reading" laser. This second laser source is adapted to emit a beam of coherent electromagnetic radiation. Usually the reading laser emits in the visible region, which makes alignment of the interferometer easy and where good-quality and cost-effective optical and electronic components are available. One of the common choices for the second laser source is a He—Ne laser, emitting at 633 nm wavelength, due to its good stability, good mode profile, robustness and good quality over price ratio. When compact dimensions are important, visible diode lasers may be preferred The second laser source may be located outside the chamber. If the second laser source is located outside the chamber, the chamber includes a window transparent to the electromagnetic radiation emitted by the second laser source so that the electromagnetic radiation emitted by the second laser source can enter the chamber. Preferably, the transducer defines a first and a second surface, one opposite to the other. Preferably, the second laser beam impinges onto the first or the second surface of the transducer perpendicularly.

Preferably, inside the chamber, the beam (electromagnetic radiation) emitted by the excitation laser and the beam emitted by the second laser are substantially perpendicular to each other.

The electromagnetic radiation emitted by the second laser source is split in two split beams. This split can be performed for example by a first beam splitter. Each split beam is directed into one of the two different arms of the interferometer, each arm defining an optical path for the electromagnetic radiation. The first arm of the interferometer includes the transducer, where the electromagnetic radiation is back-reflected inside the first arm. The second arm terminates with an optical path changer element, where the split beam is back-reflected into the second arm. The beams of electromagnetic radiation from the two arms are recombined in a standard manner known in the art as interferometer.

The optical path changer, better detailed below, is for example a movable reflecting surface or a device able to control the interferometer optical path can be substituted to the actuators, e.g. a liquid crystal or electro-optic element or any device able to change the phase of the second laser radiation. In this way, the optical path defined by the second arm of the interferometer may be changed. The change is operated via an actuator. The actuator is adapted to operate on the optical path changer element and force the latter to change the optical path defined by the second arm.

The interferometer is designed to get balanced detection, that is, the intensity of the beam exiting the first and the second arm is the same.

The interferometer used is preferably a Michelson interferometer, mounted in a balanced arrangement which ensures the best signal-to-noise ratio possible for a given laser power. Alternatively, a Mach-Zender type interferometer can be used as well.

The proposed balanced arrangement is realized via polarization control of the second laser beam. The second laser radiation has preferably a linear polarization. Alternatively, in order to obtain a linear polarization, proper phase-retarder plates and polarizers are located downstream the second laser to obtain a linearly polarized radiation. Instead of linearly polarized light, perfectly circular polarization can be used as well as the second laser radiation beam. A first polarizing beam splitter divides the second laser beam into two parts, with orthogonal polarizations, each part travelling along one of the two arms of the interferometer. The same first polarizing beam splitter is used to recombine the radiation from the two arms of the interferometer. Another (second) polarizing beam splitter divides the recombined radiation in two parts, again with orthogonal polarizations, each part impinging on one of the two detectors.

As known, the two back-reflected beams of electromagnetic radiation interfere and form an interference pattern. The interference pattern, or interference fringes, give information about the difference in optical path lengths between the two arms of the interferometer.

Due to the oscillations of the transducer, the optical path defined by the first arm of the interferometer changes in length. Therefore, an analysis of the interference fringes can be used to determine the amplitude of the oscillations of the transducer and then, in turn, it is possible to obtain the concentration of the gas to be analysed inside the chamber.

The fringes caused by the interference between the electromagnetic radiation traveling in the first arm and in the second arm of the interferometer can be detected by a suitable detector, such as a photodetector known in the field. The detector preferably has a sufficiently high bandwidth to detect the oscillation frequency of the transducer. Further, preferably, the detector performs the detection, with the lowest possible background noise. Preferably, the detector has a bandwidth larger than the oscillation frequency working point.

The back-reflected beams travelling in the interferometer (and interfering) can be split in two at the output of the interferometer. The split may be performed, for example, by the second beam splitter. The second beam splitter can be a polarization beam splitter. If the second beam splitter is not a polarization beam splitter per se, further polarizers may be present in the interferometer, so that the two beams divided by the second beam splitter have mutually orthogonal polarization. In both cases, the second beam splitter is called "polarization beam splitter", i.e. both in case in which it is in itself a polarization beam splitter or in case polarizers are added. The direction of the polarization axis is arbitrary, but the two split beams are preferably orthogonally polarized. The two split beams are then impinging onto the first and the second detector, part of the sensor of the invention.

Calling D1 and D2 the detectors, both beams are focused into the two detectors D1 and D2. Assuming plane waves, the electric field of the interfering back-reflected laser beams before the second beam splitter can be written using Jones formalism:

$$\vec{E}_7 = \frac{E_A}{\sqrt{2}} e^{(\varphi_A - i\omega t)} + \frac{E_B}{\sqrt{2}} \begin{bmatrix} 1 \\ -1 \end{bmatrix} e^{(\varphi_B - i\omega t)}$$

where the two components of the vector represent the field components along the horizontal and the vertical axes. Here $E_A$ and $E_B$ are the amplitudes of the back-reflected beams coming from the transducer and the optical path changer element paths (e.g. A being the first arm and B the second arm of the interferometer), respectively, with phases $\varphi_A$ and $\varphi_B$. Assuming that the emerging beams from the beam splitter are horizontally and vertically polarized, respectively, the vertical polarization components of one of the beams which is impinging onto the first detector can be calculated by multiplying the Jones-matrix representing the polarizing beam splitter $$\begin{bmatrix} 0 & 0 \\ 0 & 1 \end{bmatrix}:$$

$$\vec{E}_8 = \vec{E}_7 \begin{bmatrix} 0 & 0 \\ 0 & 1 \end{bmatrix} = \frac{E_A}{\sqrt{2}} \begin{bmatrix} 0 \\ 1 \end{bmatrix} e^{(\varphi_A - i\omega t)} - \frac{E_B}{\sqrt{2}} \begin{bmatrix} 0 \\ 1 \end{bmatrix} e^{(\varphi_B - i\omega t)}$$

The detector D1 detects the field intensity:

$$I_1 = \vec{E}_8 \cdot \vec{E}_8 = \frac{E_A{}^2 + E_B{}^2}{2} + E_A E_B \cos(\varphi_A - \varphi_B) \quad (2)$$

Similarly, the horizontal polarization components at the exit of the beam splitter can be calculated by multiplying the Jones-matrix representing the polarizing beam splitter $$\begin{bmatrix} 1 & 0 \\ 0 & 0 \end{bmatrix}:$$

$$\vec{E}_9 = \vec{E}_7 \begin{bmatrix} 1 & 0 \\ 0 & 0 \end{bmatrix} = \frac{E_A}{\sqrt{2}} \begin{bmatrix} 1 \\ 0 \end{bmatrix} e^{(\varphi_A - i\omega t)} + \frac{E_B}{\sqrt{2}} \begin{bmatrix} 1 \\ 0 \end{bmatrix} e^{(\varphi_B - i\omega t)}$$

and the detector D2 detects the field intensity:

$$I_2 = \vec{E}_9 \cdot \vec{E}_9 = \frac{E_A^2 + E_B^2}{2} + E_A E_B \cos(\varphi_A - \varphi_B) \quad (3)$$

Therefore, the fringes of interference between the back-reflected beams that carry the information on the oscillations of the transducer can be analyzed either studying a signal emitted by the first detector, signal function the detected beam of equation (2), or a signal emitted by the second detector, signal function of the detected beam of equation (3).

If it is assumed that, at rest conditions, i.e. when there is no transducer displacement, the two arms of the interferometer are set so that $$\varphi_A - \varphi_B = \frac{3\pi}{2} \quad (4)$$

the following applies.

Assuming that the oscillation of the transducer is a harmonic signal u(t)=S sin(2πf·t), oscillating at the laser modulation frequency f, the two outputs of the detectors D1 and D2 give an oscillating signal proportional to u(t) with a fixed background equal to the total field intensity $$\frac{E_A^2 + E_B^2}{2}:$$

$$I_{1,2} = \frac{E_A^2 + E_B^2}{2} \mp E_A E_B \sin\left(\frac{2\pi u(t)}{\lambda}\right) \approx \frac{E_A^2 + E_B^2}{2} \mp \frac{2\pi E_A E_B}{\lambda} u(t) \quad (5)$$

The harmonic displacement u(t) of the transducer has an amplitude S proportional to the gas concentration, according to Eq. (1). In order to retrieve the value of the oscillation amplitude S, a demodulation may be performed. For example, a lock-in amplifier may be used to demodulate the detector signal at the reference frequency f. This operation can be done on the D1 (or D2) signals. Thus, analyzing the signal detected by the first or the second detector, the oscillations of the transducer can be measured.

The above sensor operates according to the method of the invention.

Preferably, the excitation laser is operated at a given current and temperature so that the frequency of the laser light matches the molecular transition. The modulation of the excitation laser beam operates as follows. A modulation at the frequency f is added to the driving current of the first laser and, in addition, a slow triangular ramp (with a frequency much slower than f) is added to the current in order to scan the excitation laser optical frequency across the molecular transition.

As the excitation laser optical frequency enters in resonance with the molecular transition of the gas of interest, a molecular excitation modulated at the frequency f is induced, followed by the molecular non-radiative relaxation, which produces the modulated pressure wave in the gas sample.

Such wave hits the transducer and induces a modulated displacement at the frequency f and with an amplitude proportional to the amplitude of the pressure wave.

Preferably, the modulation frequency is so selected that f matches the resonance frequency of the transducer, or one of the higher-order resonances.

Anyway, the modulation frequency could be out of the mechanical resonance.

The transducer displacement is measured via the Michelson interferometer, described above.

Preferably, a specific working point is set, in other words a value for $\varphi_A$-$\varphi_B$ is set, as well as the power level impinging onto the detectors. For example, the conditions according to eq. (4) are set. In this way, any displacement of the transducer is measured with the highest sensitivity of the interferometer, corresponding to the maximum slope of the sinusoidal signal. This is true for the two signal outputs at the first and second detectors D1 and D2, according to eq. (5).

Preferably, the signal output from the first detector, D1, or the second one, D2, is demodulated by a lock-in amplifier around the modulation frequency f to retrieve the amplitude of the cantilever oscillation. The lock-in amplifier filters the signals coming from the first or the second detector (and/or their difference signal) with a bandwidth set by the lock-in parameters, and demodulates it at the frequency f, thus extracting only the signal amplitude modulated at the frequency f, averaged with a time constant T. Vibrations of the transducer at frequencies sufficiently outside the set bandwidth are filtered out and do not contribute to the noise of the final measurement. In this way, on one side, the background noise contributions affecting the signal are largely suppressed and, on the other side, a measurable DC signal proportional to the amplitude of the transducer oscillation is obtained.

Preferably, before performing the measurement with an unknown gas, a measurement is made with known gases, to calibrate the sensor of the invention. The sensor is calibrated by using gas samples with certified concentration of the target molecules: for a given concentration of the gas sample, the amplitude of the measured interferometric signal is recorded and associated to the known concentration. This procedure is repeated for different gas concentrations and a one-to-one function is set between the measured interferometric signal and the gas concentration. This function allows retrieving any unknown concentration (of the same molecule) provided that the sensor operating conditions are the same of those set during the calibration.

Given this configuration, the measured signal demodulated by the lock-in amplifier is affected by several noise contributions which may decrease the final signal-to-noise ratio of the single acquisition and/or affect the repeatability of the measurements, thus decreasing the final sensitivity. These noise contributions are mainly related to instabilities of the interferometer and to environmental noise, and may include:

- slow drifts of the relative length of the two arms, not due to the transducer displacement. This produces a deviation from the selected working point, such as the condition set by eq. (4), making the interferometer exiting the optimal maximum-slope operating condition. This produces slow variations in time of the amplitude of the interferometric signal, invalidating the sensor calibration and affecting both the single acquisition (if the drift time is comparable with the slow ramp spanning the excitation laser frequency and the lock-in time constant t) and the repeated acquisitions (because repeated acquisitions occur at different operating points of the interferometer). As a consequence, the single acquisition may be distorted, repeated acquisitions produce different measured amplitudes and, finally, the calibration is no more valid;

fast mechanical/acoustical noise inducing vibrations of the interferometer components. This noise produces fast variations of the length of the two arms, makes the working point of the interferometer to rapidly change and thus introduces noise in the measured interferometric signal.

These noise contributions are not filtered out by the lock-in amplifier, because they induce variations in the amplitude of the signal u(t)=S sin(2πf·t) oscillating at f (in other terms they affect the S value) and directly translate into amplitude noise in the measured spectra. This decreases the final detection sensitivity.

According to the invention, in order to overcome this problem, a differential detection scheme, centered on the working point (which is preferably the zero) is applied. This differential detection scheme is obtained because the two beams have perfectly orthogonal polarization when the transducer is not moving.

Any unbalance in polarization gives a nonzero signal, as better detailed below. An electronic locking loop which fixes the interferometer operating point to a desired working point such as, for example, the condition set by Eq. (4), is considered. This is made by using a differential signal $I_D$ as reference, as detailed below.

The sensor includes a circuit board or any other suitable circuitry which is adapted to create a signal which is equal to the difference of the signals obtained by the two detectors detecting the two different interfering back-reflected beams outlined above. Thus, the difference signal is the signal generated by subtracting the value of one signal detected by the first detector from the value of the other signal detected by the second detector. For example, still assuming planar waves, the differential component $I_D=I_2-I_1$ is thus given by:

$$I_D = 2E_A E_B \cos(\varphi_A - \varphi_B)$$

The difference signal, therefore, is an oscillating function and depends on the difference of the phases $\varphi_A$-$\varphi_B$.

Any displacement of the transducer u(t) produces an unbalancing of the signals and a non-null value for $I_D$:

$$I_D(t) = 2E_A E_B \cos\left(\frac{3\pi}{2} + \frac{2\pi u(t)}{\lambda}\right) = 2E_A E_B \sin\left(\frac{2\pi u(t)}{\lambda}\right) \quad (6)$$

Where it has been considered that eq. (4) applies. It is to be understood that the use of equation (4) is one of the possible choices; indeed, any value of the phase difference can be selected.

If the displacement is small enough compared to A, the previous equation can be approximated with:

$$I_D(t) \approx \frac{4\pi E_A E_B}{\lambda} u(t)$$

Where, as detailed above, u(t)=S sin(2πf·t).

In practice, in a more intuitive view, the interferometer translates a displacement of the transducer into a measurable amplitude signal, while the slope of the sinusoidal interferometric signal sets the value of the displacement-to-amplitude conversion factor. By setting the two arms in the condition of Eq. (4), this conversion factor is set at its maximum value (i.e. maximum slope of the sinusoidal signal) and the measured amplitude is maximized.

According to the invention, it is desired to keep fixed the working point of the interferometer, that is, it is desired to satisfy eq. (4), where the difference of the two signals coming from the first and the second detectors remains equal to zero. This working point (which means, the value of the difference between the two currents) is kept fixed during the measurement of gas concentration, while the transducer is oscillating. As said, Eq. (4) is just one possible choice for setting the working point and other choices are possible. To this purpose, the optical path changer element comes into play. In order to keep the working point fixed, then the optical path defined by the second arm of the interferometer needs to change. The optical path is for example changed operating on the actuator which in turn operates on the optical path changer element. For example, if the optical path changer element is a movable reflecting element, the latter is displaced. This induces a variation of the optical path of the second arm of the interferometer. In order to "lock" the value of the difference signal $I_D$ to the desired value, therefore, the actuator is used, which changes the optical path defined by the second arm of the interferometer. The actuator may be, for example, a piezoelectric element which physically displaces the movable reflecting element. The locking point is fixed at the zero value of $I_D$, and this value is maintained by acting on the movable reflecting element, thus adjusting the corresponding path length. This locking can be performed for example by using a proportional-integral-derivative controller (PID controller), which defines a locking bandwidth. This solution has several advantages:

It cancels out the noise contributions within the locking bandwidth, thus reducing the noise floor;

It cancels out the slow drifts of the working point, thus solving the problem of measurements repeatability over time and calibration.

When the frequency of the transducer (i.e. the modulation frequency of the infrared laser) is much higher than the locking bandwidth, the locking circuit is unable to "correct" the phase variations induced by the transducer oscillations. This means that the locking circuit does not perturb the signal due to gas absorption, which can be retrieved by analyzing one of the two detectors outputs (D1 or D2), and only maintains the interferometer stable over time in the optimal conditions. Therefore, in a first embodiment of the invention, the desired spectroscopic information are obtained from the signal emitted by the first detector or the second detector in response to the detection of the first or the second interference beam. In this embodiment, therefore, the D2-D1 signal is used for the locking circuit and the D1 (or D2) output is sent to the lock-in amplifier for the spectroscopic analysis. In order to achieve this condition, instead of using the fundamental transducer resonance frequency (if too low), one of the higher resonant modes can be used. A further advantage of using a high-f resonant mode is the lower contribution from ambient noise at higher frequencies, which increases the final signal-to-noise ratio.

In a second embodiment, a different signal is used to obtain spectroscopic information. The first embodiment described above applies when the locking bandwidth is much smaller than the modulation frequency f, which can be achieved for example by using a higher resonant mode of the transducer. Alternatively, another option is using a locking bandwidth larger than the modulation frequency. This may happen, for example, when a low-f resonant mode, e.g. the fundamental one, is used. This option may be particularly advantageous when the ambient noise is low, and does not affect too much the measurement. An advantage of using a low-frequency mode is that usually it is stronger than higher-order modes, so the oscillation amplitude of the transducer is larger. In this case, the locking bandwidth may be of the same order of magnitude or even higher than the modulation frequency. It means that the locking circuit not only maintains the interferometer working point at the zero value of D2-D1, but also "corrects" the oscillation of the cantilever. As a consequence, the signal from D1 or D2 is suppressed by the locking loop (partially or totally, depending on the parameters of the locking circuit). In this case, instead of using the D1 (or D2) signal for the spectroscopic analysis, it is convenient to use the error signal sent to the actuator connected to the optical path changer element. Assuming that the locking circuit is strong and fast enough to completely cancel out the interference signal, it means that the locking loop is fast enough to follow the transducer oscillations and it acts on the actuator to correct the phase variations induced by the transducer oscillations. As a consequence, the D1 (or D2) signals are kept to a constant value, usually zero, and they cannot be used for the spectroscopic analysis. Nonetheless, the spectroscopic information is not lost, because it is now transferred to the signal moving the actuator acting on the optical path changer element (for example displacing the movable reflecting element): this signal, which is for example the error signal of the PID, now contains the contributions from the external noise and slow drifts of the interferometer plus the contribution from the transducer. The latter is the only contribution oscillating at f, and thus can be easily separated from the "noise" contributions. In this case, the error signal is split in two parts: one is sent to the PID circuit for the locking loop, the other is sent to the lock-in amplifier for the demodulation. The demodulated signal from the lock-in amplifier reproduces the oscillation amplitude of the transducer and can be used for the spectroscopic analysis. Also in this case the locking circuit improves the signal-to-noise ratio of the measurement because it removes the slow drifts and maintains the interferometer working point to the optimal condition.

The interference fringes reaching the detector may be further processed, for example a demodulation can take place. Preferably, a Fourier Transform of the signal obtained from the detector is performed. From the Fourier Transform analysis, information on the gas concentration can be obtained.

Preferably, the transducer is realized in one of such materials: Silicon, $SiO_2$, $Si_3N_4$, SiC and polymers including their amorphous or crystalline forms or in non-stoichiometric forms. The material constituting the transducer is deposited on a silicon wafer substrate. The transducer can be coated by a metal, a metal oxide or a dielectric multilayer.

These materials allow the use of the transducer also in "harsh" environment.

Preferably, the sensor includes a damping and insulation structure located between the chamber and the transducer, the transducer being connected to the chamber only via the damping and insulation structure. In order to isolate the mechanical mode resonant at a given frequency from the external acoustic noise, which may degrade the signal by increasing the background noise and by creating locking issues, a damping and insulating structure is provided. The structure is interposed between the transducer and the chamber. The structure surrounds the transducer or, alternatively, holds it at least from one side. Preferably, the mass of this structure is much bigger than the mass of the transducer.

Preferably, the desired constant value is equal to zero.

Preferably, the working point of the interferometer, that is, the value of $I_D$, which is set and "locked" is the value written in equation (4). In this way, it maintains the working point at the maximum slope of the interferometric signal, thus maximizing the conversion factor.

Preferably, wherein the dimension of the transducer ranges between 10 μm and 2 cm.

Said dimension is defined as the segment having the maximum length and connecting two different points of the transducer.

Sizes are directly linked to the frequency resonances of the transducer. The resonances are tailored depending on application/environment/target molecules.

Preferably, the method comprises the step of putting the transducer into oscillation at a frequency equal to the resonance frequency of the transducer or to a higher-order resonance.

The transducer has a mechanical resonant frequency and higher-order resonances. Preferably, either the resonance frequency or a higher-order resonance are selected due to the fact that large oscillations are obtained. Larger oscillations are easier to detect and with a higher signal-to-noise ratio.

Preferably, the method comprises the step of obtaining the gas concentration from the step of detecting the first interference beam or from the step of detecting the second interference beam if the frequency of the movements of the optical path changer element is much slower than the modulation frequency of the excitation laser.

Alternatively, preferably the method comprises the step of obtaining the gas concentration by:

- Operating the actuator so as to change the optical path length of the second arm so that the difference signal is kept equal to the working point value;
- obtaining the gas concentration by demodulating the error signal.

The invention will be now better described with non-limiting reference to the appended drawings, where:

FIGS. 9 and 10 are a top view and a perspective view of an additional embodiment of a transducer included in the sensor of FIGS. 1-3;

FIGS. 11-14 show top view of different embodiments of a detail of FIGS. 9 and 10;

FIGS. 22, 23 and 24 show different embodiments of a transducer included in the photoacoustic sensor according to the invention, FIGS. 25*a*, 25*b*, 26*a* and 26*b* refer to spectroscopic acquisitions of a $N_2O$ line.

Figure 1:
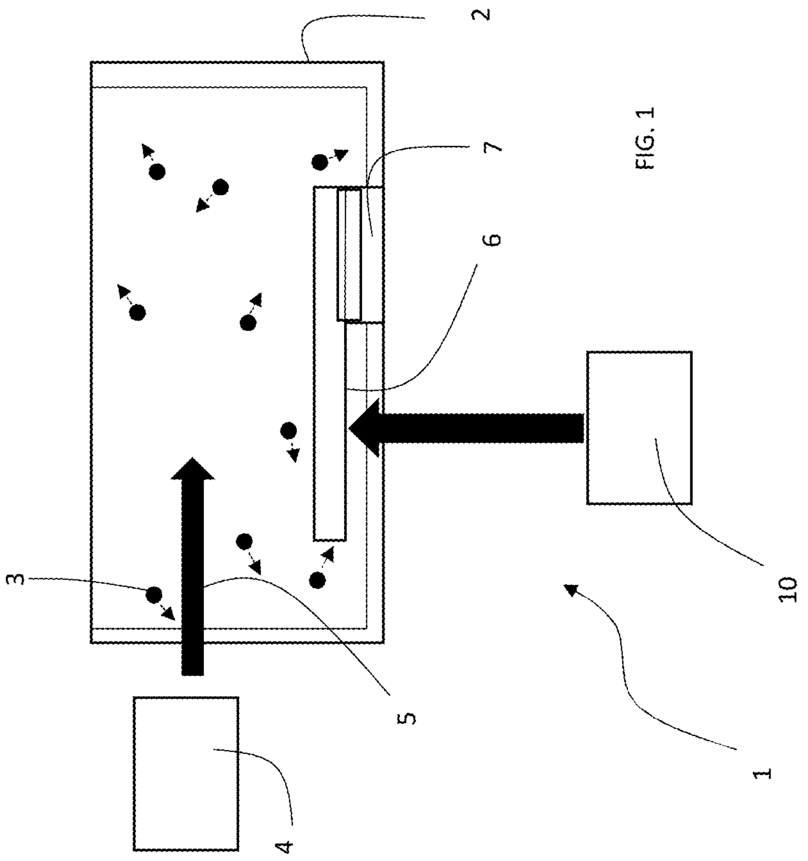
FIG. 1 shows a schematic representation of a sensor for the measurement of a gas concentration according to the invention.

With initial reference to FIG. 1, a sensor for gas realized according to an embodiment of the invention is schematically depicted and globally indicated with 1.

The sensor 1 is used to measure the concentration of the selected gas. Preferably, therefore, using sensor 1, the concentration of the selected molecular species can be measured and the composition of the gaseous sample analyzed.

The sensor 1 includes a chamber 2 where the gas 3 to be measured is located. The chamber 2 may work in static conditions or under a constant flow regime. In the first case, the chamber is filled with the gas of interest, at the desired pressure, and sealed or closed with a valve, in other word it is gas-impermeable for the gas 3 of interest. In the second case, a constant flux of the gas of interest is maintained in the chamber for all the time duration of the measurement. The gas 3 of interest is depicted as moving balls in FIG. 1.

The sensor 1 further includes a first laser 4, called excitation laser. The laser may be for example an Infrared laser ("IR Laser" in FIG. 2), and must emit a radiation resonant, in frequency, with the desired transition of the target molecule. This excitation laser is adapted to produce an excitation laser beam, depicted with an arrow 5 in FIGS. 1 and 2, which enters in the chamber 2 and interacts with the gas 3. The excitation laser beam can be modulated in frequency and/or amplitude.

The excitation laser beam 5 interacts with one (or more, when tuned in frequency) gas molecular species in the chamber 2, which absorb part of the light and re-emit the energy in form of collisional energy to the other gas molecules in the chamber. This creates a pressure wave propagating in the gas sample 3. The absorption, and the consequent generation of the pressure wave, can be modulated over time by modulating the interaction between the excitation laser beam 5 and the gas 3. Therefore, as above mentioned, the excitation laser 4 is adapted to generate a laser beam 5 which can be modulated in frequency or amplitude.

The chamber 2 further comprises a transducer 6, for example a MEMS-structure. The transducer 6 is in contact with the gas 3 so that the pressure wave created by the excitation laser beam 5 can hit the transducer itself. In the depicted embodiment, the transducer 6 is attached to a wall 2*a* of the chamber via a pedestal 7. Preferably, the transducer 6 is located in the chamber 2 at a distance from the excitation laser beam 5 which maximizes the effect of the pressure wave on the transducer. The pressure wave generated by the excitation laser beam moves the transducer 6. Modulating the excitation laser beam 5 as detailed above, the pressure wave at the resonant frequency of the transducer 6 can be created. Preferably, therefore, the transducer is put into oscillation by the pressure wave at a frequency equal to the resonant frequency of the transducer 6 or a lower harmonic of the resonant frequency.

One surface of the transducer 6 is coated by a reflective coating, so that the coated surface can act as a mirror. The coating material and thickness are determined in order to resist in the gas ambient and maximize the reflectance at the readout laser wavelength.

The transducer 6 comprises a main component 6*c*. The main component 6*c* comprises a reflective element 6*d* with at least a reflective portion forming a mirror of the interferometer.

Figure 7:
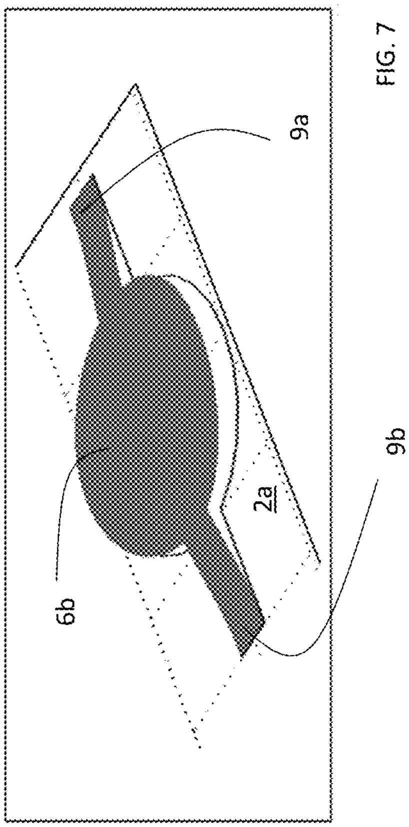
FIGS. 5-8 are perspective views of four different embodiments of a transducer included in the sensor of FIGS. 1-3.
Figure 8:
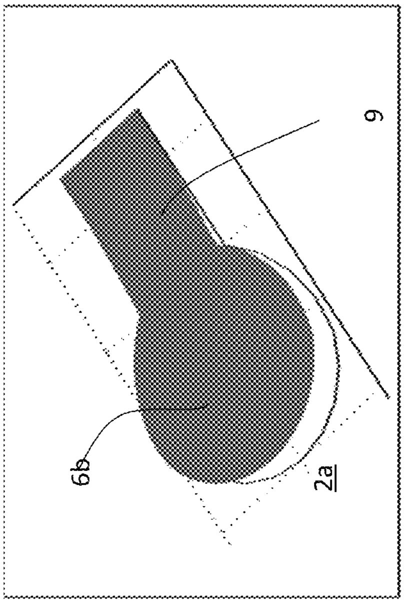
Figure 5:
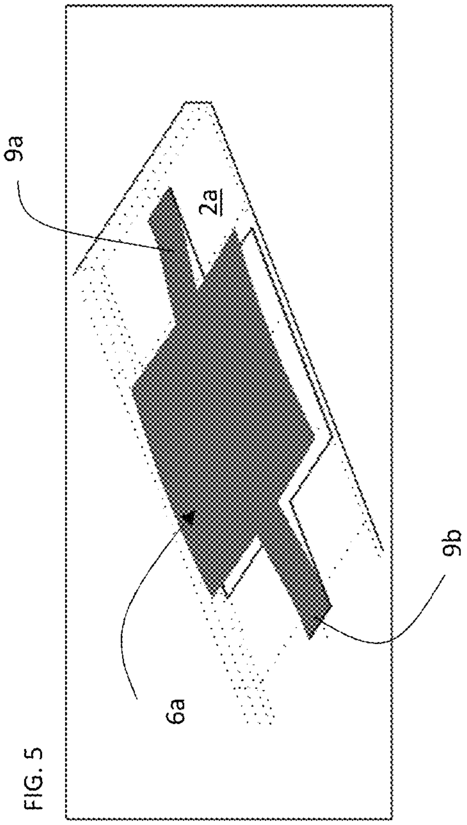
Figure 6:
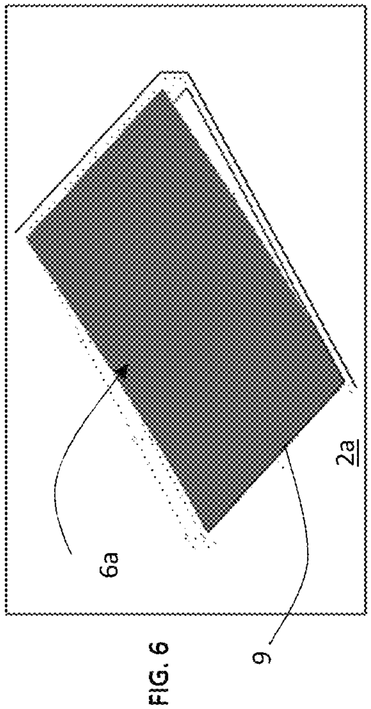

The transducer 6 can have any shape. Some possible shapes are depicted in FIGS. 5-8. A first example of transducer is a rectangular MEMS 6*a*. The rectangular MEMS may be connected to the chamber 2, such as to wall 2*a*, in a single location 9 (see FIG. 6) or the same structure 6*a* can be connected to the wall 2*a* in more locations, such as 2 locations 9*a*, 9*b* of FIG. 5. Any number of locations can be considered as well. In the example of FIGS. 7 and 8, a circular MEMS 6*b* is used as the transducer 6. As in the case of the rectangular MEMS 6*a*, the circular MEMS 6*b* may be connected to the chamber 2, such as to wall 2*a*, in a single location 9 (see FIG. 8) or the same structure 6*b* can be connected to the wall 2*a* in more locations, such as 2 locations 9*a*, 9*b* of FIG. 7. Any number of locations can be considered as well.

Furthermore, the transducer 6, regardless of its shape, can be connected to the chamber 2 in multiple stages, as depicted in FIGS. 9 and 10. FIGS. 9 and 10 refer only to the circular MEMS 6*b*, however the same principle can be applied to any shape of the transducer 6. In other words, the reflective element 6*d* of the transducer 6 may be connected directly to the chamber or a "stage" can be interposed in between. For example, the sensor 1 may further comprise a damping and insulation structure 15 positioned between the main component 6*c* and the chamber 2. That is, the connection between the chamber 2 and the main component 6*c* is made via a damping and insulation structure 15. The role of the damping and insulation structure is to isolate the mechanical mode resonant at a given frequency in the transducer 6 from the external acoustic noise, which may degrade the signal by increasing the background noise and by creating locking issues (see below in the description of the interferometric detection method). Essentially, the main component 6*c* is "isolated" by using a multi-stage structure (in FIGS. 9 and 10, single-stage transducers 6 are represented for simplicity). The damping and insulation structure 15 can be circular or polygonal symmetry (for example rectangular). The geometrical shape of the damping and insulating structure 15 may depend on the geometry of the main component 6*c* and from the manufacturing process. The damping and insulation structure 15 has a mass much bigger than the mass of the main component 6*c*. The damping and insulation structure connects the chamber to the main component 6*c*. The main component 6*c* is not otherwise connected to the chamber, that is, the main component 6*c* is connected to the chamber only via the damping and insulating structure 15. In principle, a large mass (with respect to the main component 6*c* and the supporting structures detailed below) isolates the main component 6*c*, filtering out the low frequency noise. Various geometries for the suspension structures are possible (see point c below). In this way, the overall structure transducer+damping and insulation structure 15 has several mechanical modes, including at least one in which only the main component 6*c* moves. The frequency of this mode is far from the fundamental mode of the global structure. For this reason, it is possible to obtain a good mechanical insulation and to work with a good signal-to-noise ratio for the interferometer.

Preferably, the damping and insulation structure 15 surrounds the main component 6*c*.

Preferably, the connections between the damping and insulation structure 15 and the transducer are made via one or more first suspension structure, all named 16 in the figures. The first suspension structure is a special type of connection between the reflective element 6*d* and the chamber or the reflective element 6*d* and the damping and insulation structure 15. The first suspension structure comprises elongated elements (named also as suspensions) that reduce the length of the outer perimeter of the reflective element 6*d* in connection to the damping and insulation structure 15.

Second suspension structure 18, similar to the first suspension structure 16, may also be present, to connect the damping and insulation structure 15 to the chamber 2.

The suspension structures 16, 18 can have four different embodiments, depicted in FIGS. 11-14. In the following, only the first suspension structure is indicated in the figures, but the same shape applies also to the second suspension structure 18 as well. In FIG. 11, a beam shaped suspension 16 is shown. The suspension is substantially rod-like and it extends along a single direction for a given length. In FIG. 12, a L-shaped suspension 16 is shown. The suspension extends in a first direction for a first given length, then it makes a 90° turn and it extends for a second given length along a second direction. In FIG. 13, a Z-shaped suspension is shown. The suspension extends in a first direction for a first given length, then it makes a turn<90° and it extends for a second given length along a second direction, it makes a second turn<90° and it extends for a third length along a third direction, preferably parallel to the first direction. In FIG. 14, an S-shaped suspension is shown.

A combination of the above shapes can be used as well to form a suspension 16, 18. For example, in order to form a suspension having a spiral structure, beams and L-shapes can be suitably combined. Furthermore, two or more S-shaped structures can be combined in succession.

The choice of the suspension structure shape depends on the torsional rigidity of the transducer 6. Further, the choice of the suspension structure shape depends on the type of movement performed by the transducer 6. Further, the choice of the suspension structure shape depends on the operative frequency of the transducer.

In case of transducers having a relatively complex geometry, structures of similar dimensions could be resonant at quite different frequencies with different displacements, in particular with different kind of displacements. It is possible to have transducers having substantially the same dimension (where the dimension is meant as the maximum dimension of the transducer, as above defined) but very different resonance frequency. The range of achievable resonance frequencies spans from hundreds of Hz to few MHz. This is obtained by choosing the number of anchoring points where to connect the reflective element 6*d* to the damping and insulation structure 15 via the suspenders 16. It also depends on the number of anchoring points where to connect the damping and insulation structure 15 to the chamber 2 via the suspenders 18. It also depends on the shape of the suspenders.

Furthermore, the sensor 1 comprises an interferometer 11 (visible in FIGS. 2 and 3) and a second laser 10, called a reading laser. The interferometer 11 is used, together with the second laser 10, to detect the oscillation of the transducer 6 by interferometry. The second laser 10 is preferably a low power laser, for example a HeNe laser or a diode laser. The interferometer 11 is for example a Michelson type specifically designed to have balanced detection through laser beam polarization control.

Figure 2:
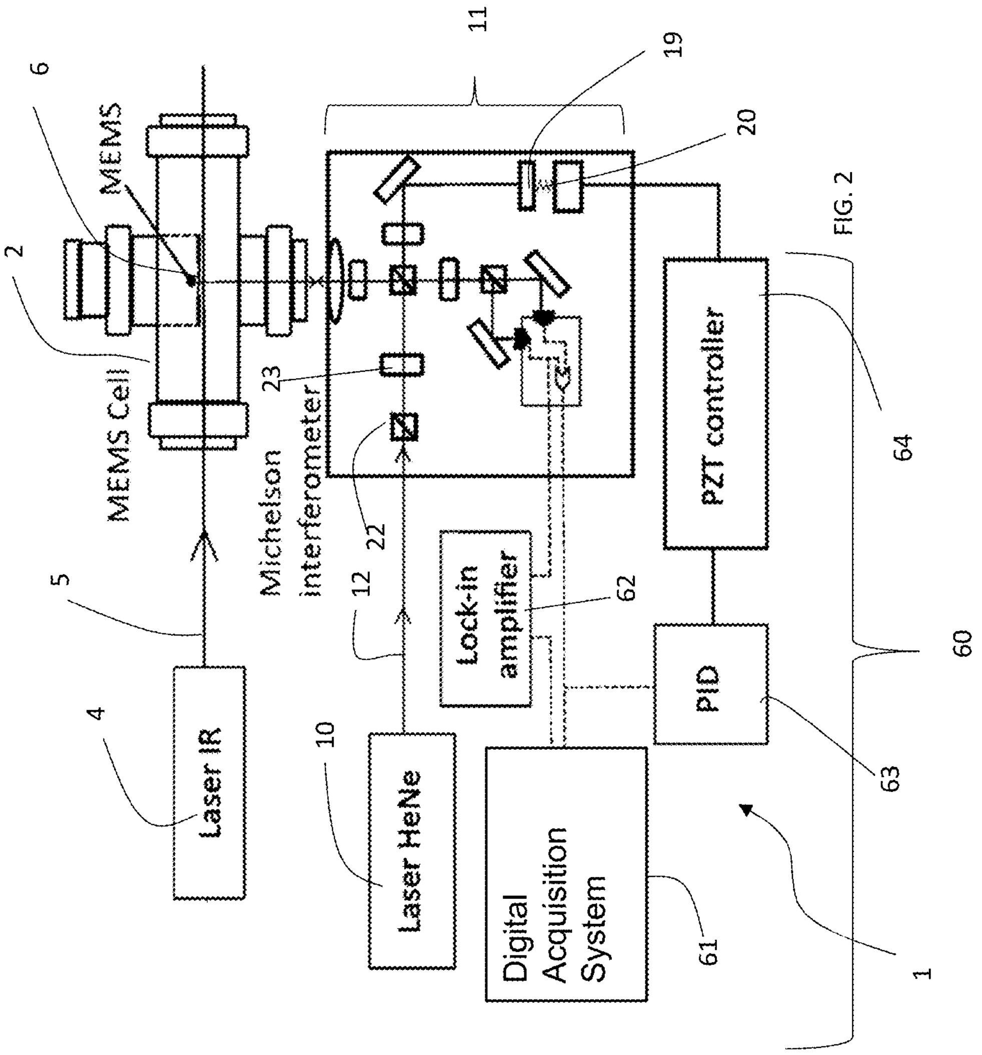
FIG. 2 is a more detailed representation of the sensor of FIG. 1.
Figure 3:
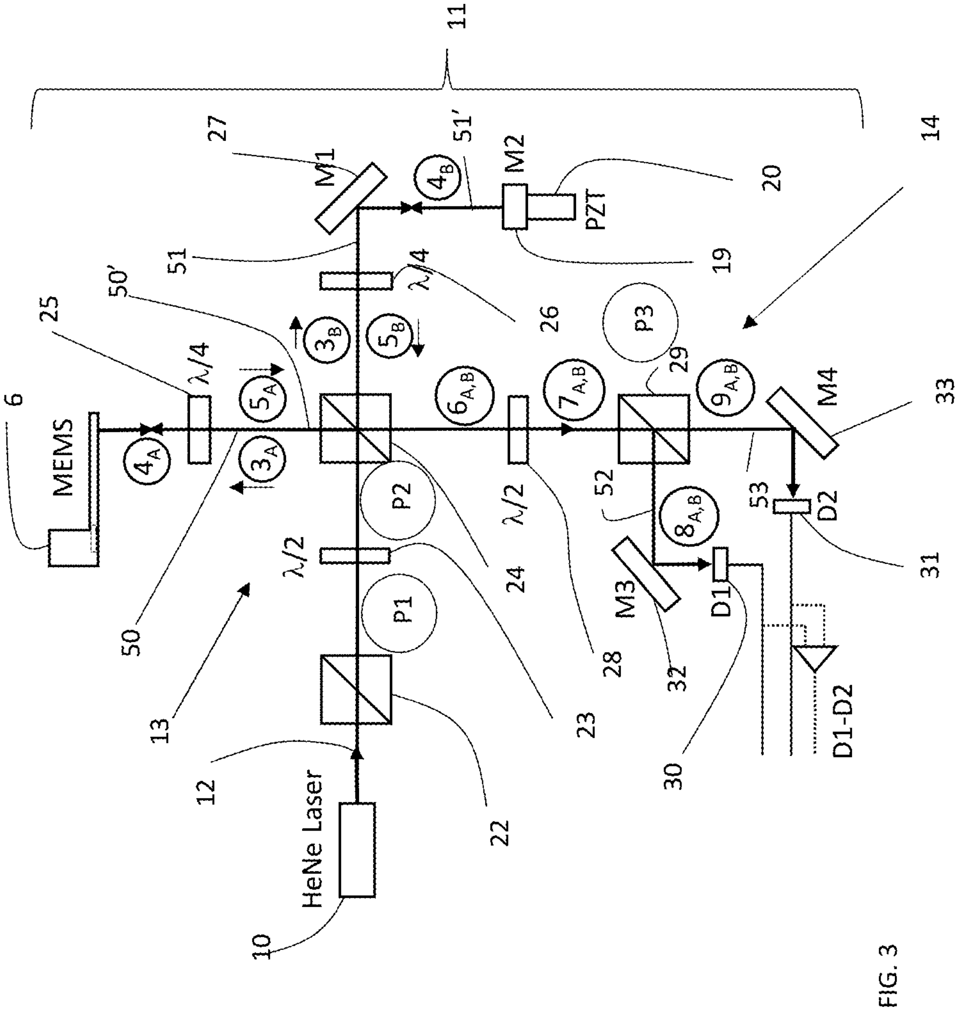
FIG. 3 is another more detailed representation of the sensor of FIGS. 1 and 2.

The detailed diagram of the interferometer is shown in the FIGS. 2 and 3.

The second laser 10 is configured to emit a second "reading" laser beam 12, depicted with arrows in FIGS. 1-3. Furthermore, the interferometer 11 comprises a first arm 13 and a second arm 14, having equal length (with reference to FIG. 3 the first arm goes from P2-MEMS-P2 and the second arm is P2-M2-P2). The first arm 13 ends with the MEMS transducer 6. The latter, as written above, has a reflective coating and acts as a partially reflecting mirror. The second arm 14 includes a movable mirror 19 and an actuator 20. The first arm 14 ends on the moving mirror 19 mounted on the actuator 16, for example a piezoelectric crystal.

The interferometer 11 comprises a first polarizer 22. After being emitted, the second laser beam 12 impinges on the first polarizer 22, which acts as a filter for the initial polarization of the laser beam, so that the second laser beam 12 exiting the first polarizer has linear polarization, for example vertical. Thus, with reference to FIGS. 3 and 4, the beam exiting the first polarizer and detected in point P1 is linearly polarized.

The interferometer 11 comprises a first waveplate 23, and a first beam splitter 24, a movable mirror 19, an actuator 20 moving the mirror 19. The second beam exiting the first polarizer 22 and impinging on the waveplate 23 rotates its polarization (23 is preferably a quarter-wave plate). Thus, a measurement of the second beam in point P2 would result in a linearly polarized state forming an angle with the vertical direction. The interferometer 11 then comprises a first beam splitter 24, which splits the linearly polarized second beam 12 into a first and a second split second beam 50, 51. The first split second beam 50 is directed towards the transducer 6 and the second split second beam 51 is directed towards the movable mirror 19.

The movable mirror 19 is mounted on a moving stage (not shown) that enables its movements in the longitudinal direction with respect to the second split second beam (in this way it is possible to adjust the length of the second arm 14). The movements are actuated by the actuator 20, for example a piezoelectric transducer. The piezoelectric transducer allows fine movements (micrometric or sub-micrometric) of the movable mirror 19. In this way, the optical path defined by the second arm 14 can be varied.

Following now the first split second beam 50, it impinges on the transducer 6. A suitable optic (not visible in the drawings) may be located in front of the transducer 6 to focalize the first split second beam 50 onto the transducer 6.

Figure 4:
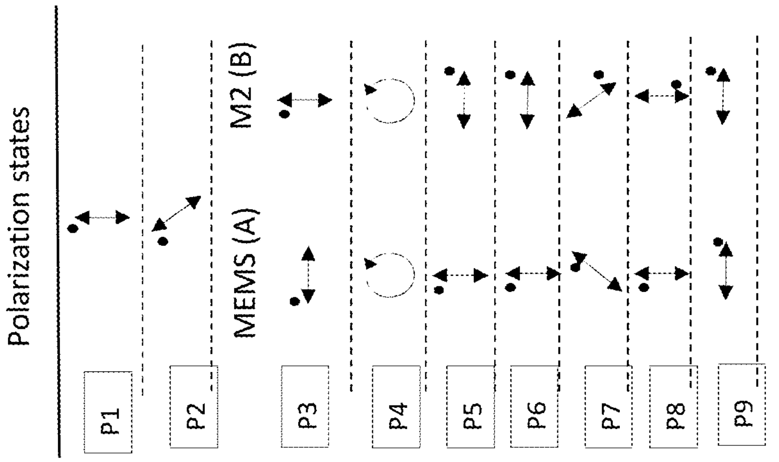
FIG. 4 is a schematic representation of the polarization of the signal travelling in the sensor of FIG. 3.

After the first beam splitter 24, the first split second beam is horizontally polarized, as for example detectable in point P3A, as visible in FIGS. 3 and 4. In its path towards the transducer 6, the first split second beam 50 impinges on a second waveplate 25 (quarter-wave plate), which rotates its polarization again. It then impinges onto the transducer 6 and it forms a back-reflected first split second beam 50'.

The back-reflected first split second beam 50' returns back along the first arm 13 of the interferometer 11 and goes again through the second waveplate 25, so that its polarization is rotated again (see point P5A in FIGS. 3 and 4). When it reaches the first beam splitter 24, back-reflected first split second beam 50' does not return towards the second laser, but it continues along the interferometer.

The second portion of the second beam 51 travels through the second arm 14 of the interferometer 11. After the first beam splitter 24, the second split second beam is vertically polarized, as for example detectable in point P3B, as visible in FIGS. 3 and 4. In its path towards the movable mirror 19, the second split second beam 51 impinges on a third waveplate 26 (quarter-wave plate), which rotates its polarization again (see point P4B). It then impinges onto a further mirror 27 and finally onto the movable mirror 19, where it forms a back-reflected second split second beam 50'.

The back-reflected second split second beam 51' returns back along the second arm 14 of the interferometer 11 and goes again through the third waveplate 26, so that its polarization is rotated again (see point P5B in FIGS. 3 and 4). When it reaches the first beam splitter 24, the back-reflected second split second beam 51' does not return towards the second laser, but it continues along the interferometer.

The waveplates 25 and 26 are quarter-wave plates, so that the back-reflected first split second beam 50' that is reflected by transducer 6 and the back-reflected second split second beam 51' that is reflected by the movable mirror 19 returns to the first beam splitter 24 with linear polarization, rotated by 90°.

At this point, the first beam splitter 24 recombines the back-reflected first split second beam 50' and the back-reflected second split second beam 51' from the two arms 13, 14 and directs it towards the detectors, detailed below. After recombining, the recombined back-reflected beam passes through a fourth waveplate 28, which rotates its polarization. The recombined beam impinges on a second beam splitter 29, so that the second beam splitter divides the recombined beam into two parts, with equal intensity. The first part is called first interference beam 52 and the second part is called second interference beam 53. The polarization of the two beams 52, 53 is one orthogonal to the other, for example, as depicted in points P8 and P9, one polarization is vertical and the other horizontal.

The interferometer 11 comprises a first and a second detector 30, 31. Preferably, the first and second detector are used for balanced detection. The first and second interference beams 52, 53 impinge on the first and second detector 30, 31, respectively. Mirrors 32, 33 may be used to direct the beams 52, 53 onto the detectors 30, 31.

The sensor 1 further comprises an electronic board 40. The first and second detectors 30, 31 are mounted on the electronic board 40.

The detectors 30, 31 emit signals that can be extracted and acquired. The signals of interest are the following: the signal from each detector (first and second detector) and the difference signal called D2-D1. The latter is the direct subtraction of the two photocurrents from the first and second detector 30, 31.

The analysis is as follows. The signals from the first and second detector 30, 31 are used as monitors of the two single arms 13, 14 of the interferometer 11, both during the alignment phase and during the spectroscopic measurement. The difference signal (D2-D1), in perfectly balanced conditions, is a zero background signal and can be used both for recording the spectroscopic absorption lines and as reference signal for electronic locking, as detailed below.

Figure 15:
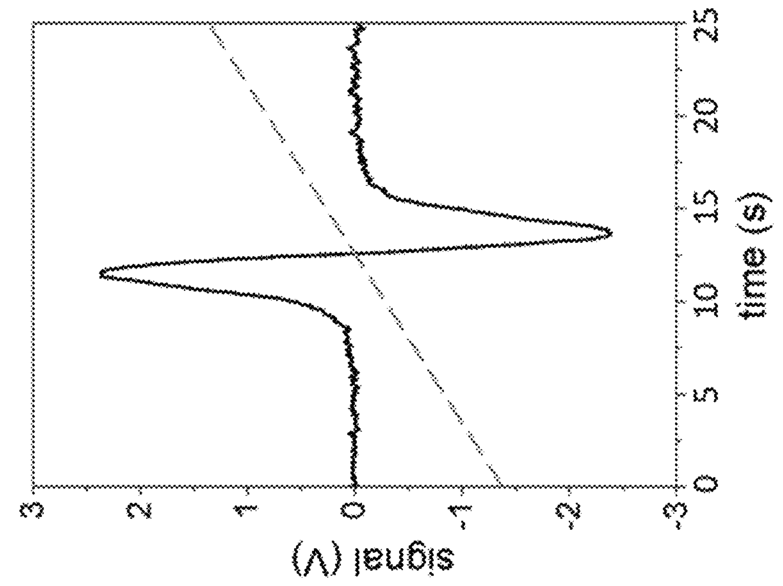
FIG. 15 shows a graph which is the result of a measurement performed with the sensors of FIG. 1-3.

The sensor 1 includes therefore a detection system 60 shown in FIG. 2. The detection system 60 includes a digital acquisition system 61, for example an oscilloscope, to which the signal from one of the two detectors 30, 31 is sent to check the alignment; the signal from the other detector is sent to a lock-in amplifier 62 that demodulates it. The lock-in amplifier 62 gives at the output either the first-derivative (1f demodulation) or the second-derivative (2f demodulation) signal of the molecular absorption of interest of the gas 3. This is the signal that is used in the spectroscopic analysis of the gas concentration. An example of such a demodulated signal is for example given in FIG. 15.

The difference signal D2-D1 is used to stabilize the interferometer 11 by means of a locking circuit. The elements of the locking circuit are: a Proportional-Integral-Differential gain circuit (PID) 63, and a voltage controller 64 for the piezoelectric actuator 20. The locking circuit drives the piezoelectric 20 acting on the movable mirror 19 and adjusts the optical path of the second split second beam 51 and the back reflected second split second beam 51', in order to have, on the detectors 30, 31, an interference that corresponds to a desired working point.

A preferred embodiment sets the working point at half the fringe. This condition corresponds to the maximum linearity and maximum dynamic response of the interferometer and allows for effective detection of oscillations of the transducer 6: any variation occurs with respect to the point of maximum slope of the signal (point of maximum slope of the sinusoidal interference signal). The locking enables the stabilization of the interferometer in the optimal response condition and, at the same time, corrects the slow drifts (due to temperature fluctuations, for example) which would lead to a progressive misalignment over time. It is therefore an ideal system for maintaining stable optimal working conditions, thus enabling applications in the field or requiring long acquisition times (for a higher detection sensitivity). The locking parameters are optimized at the chosen working point (resonance frequency and mechanical resonance modes) in order to obtain the maximum signal to noise ratio taking advantages from the lower background and from a minor sensitivity to the acoustic and environmental noise.

Figure 22:
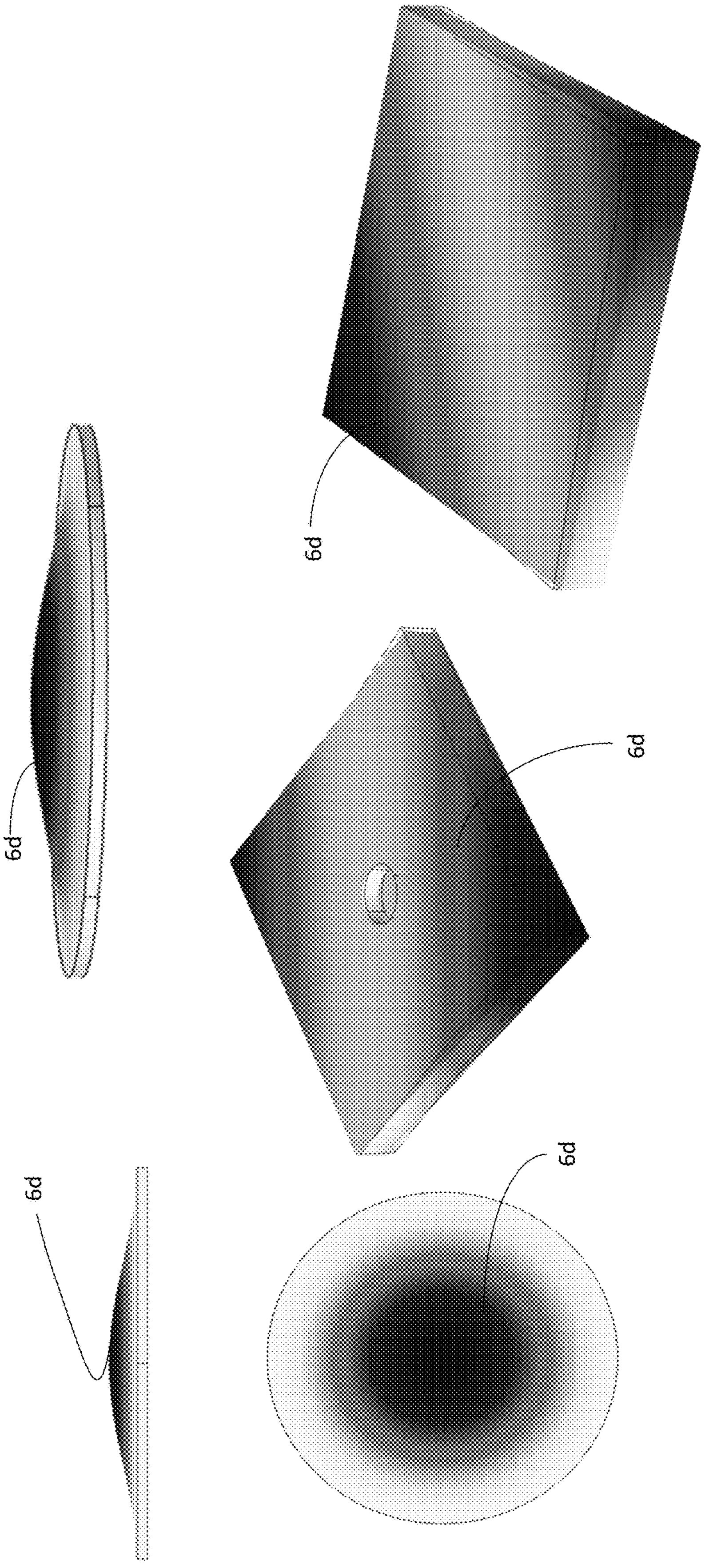

FIG. 22 shows different embodiments of the transducer 6, wherein the reflective element **6*d*** is a membrane directly connected to the chamber, i.e. without a first suspension structure.

FIG. 23 shows further embodiments of the transducer 6, wherein the main component **6*c* comprises a first suspension structure 16 between the reflective element 6*d*** and the chamber.

Figure 24:
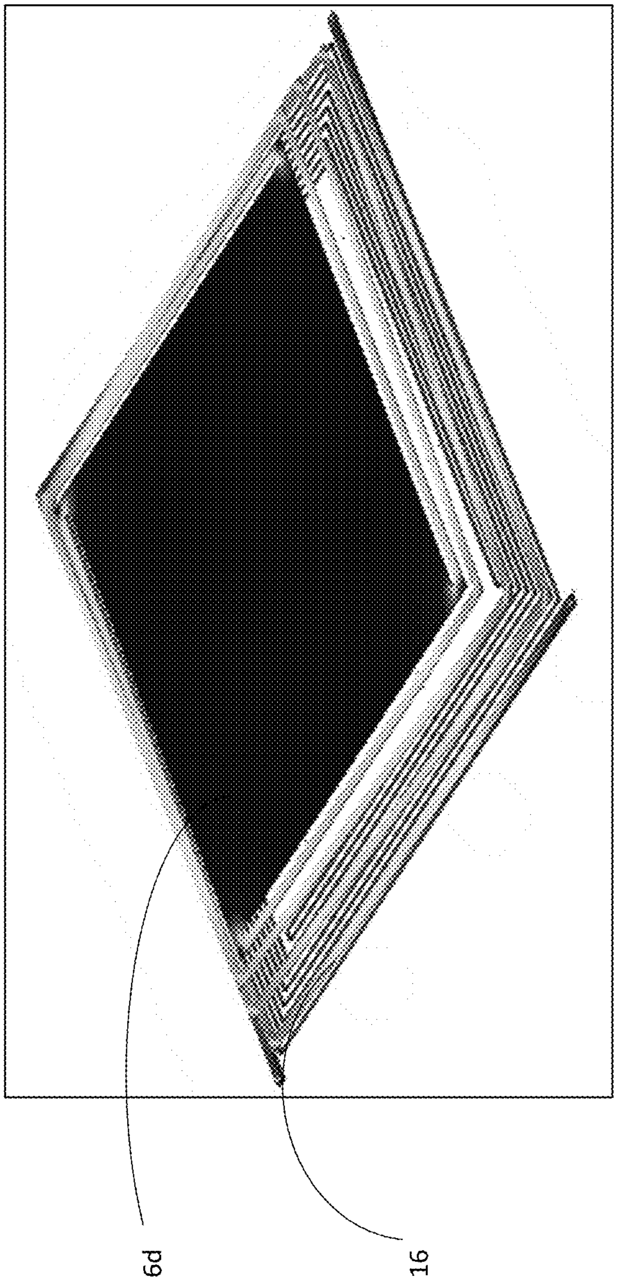

FIG. 24 shows an example of embodiment of the transducer 6, wherein the first suspension structure 16 has the shape of a spiral and connects the reflective element **6*d*** to the chamber.

FIGS. **25*a* and 25*b*** refer to a spectroscopic acquisition of a $N_2O$ line.

In particular, FIG. **25*a* shows an acquisition in resonance (frequency modulation equal to the first cantilever resonance) meanwhile FIG. 25*b*** shows an acquisition out of resonance, wherein:

Gas conditions: $N_2O$ 200 ppm in $N_2$

P=20 mbar

Integration time: 30 ms

FIGS. **26*a* and 26*b*** refer to a spectroscopic a further acquisition of a $N_2O$ line.

Figure 26A:
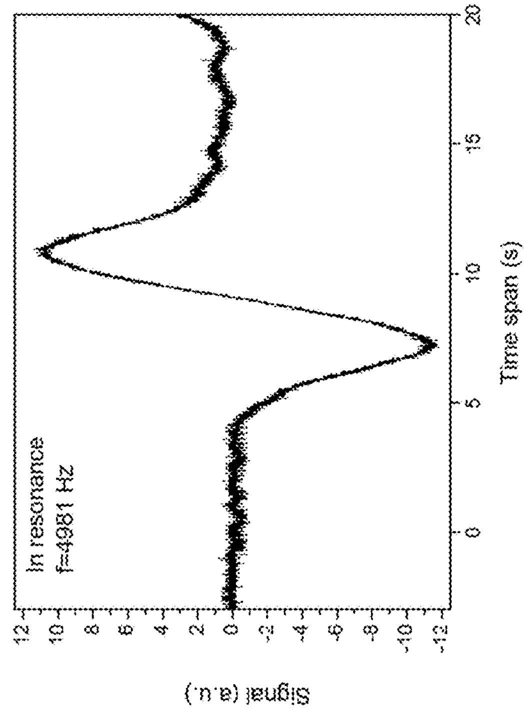
Figure 26B:
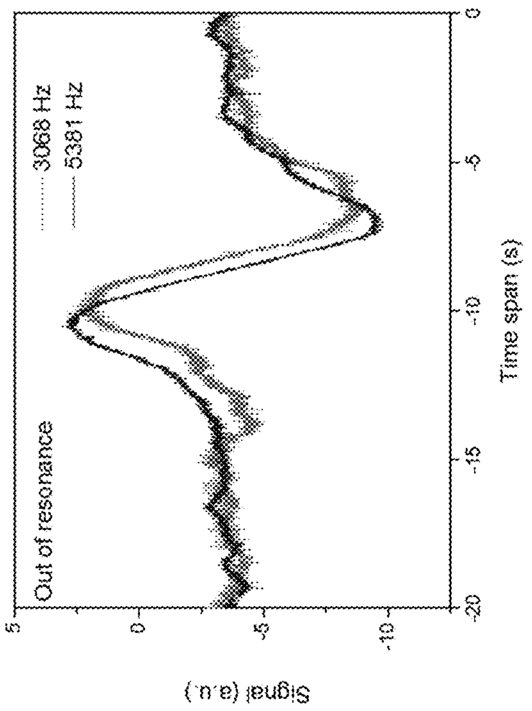

In particular, FIG. **26*a* shows an acquisition in resonance (frequency modulation equal to the third cantilever resonance) meanwhile FIG. 26*b*** shows an acquisition out of resonance, wherein:

Gas conditions: $N_2O$ 200 ppm in $N_2$

P=20 mbar

Integration time: 30 ms

EXAMPLE 1

The following gas has been studied.

QCL operating at 4526 nm tunable in the range 4520-4530 nm. The laser is scanned around the transition of $N_2O$ at 4526.86 nm (2209.523 $cm^{-1}$) in a cell containing the gas sample at a fixed pressure (13 mbar in this case) for the whole time duration of the measurement. For these measurements, a rectangular silicon cantilever with size 2 mm×4 mm and 10 μm depth has been used, and the third-order mechanical resonance has been chosen. The Locking point of the Michelson (differential signal) is set at zero. A gas sample on $N_2O$ (200 ppm concentration) in dry N2 has been used for the test. The second laser probing the Michelson interferometer is a HeNe laser emitting at 633 nm wavelength.

Figure 17:
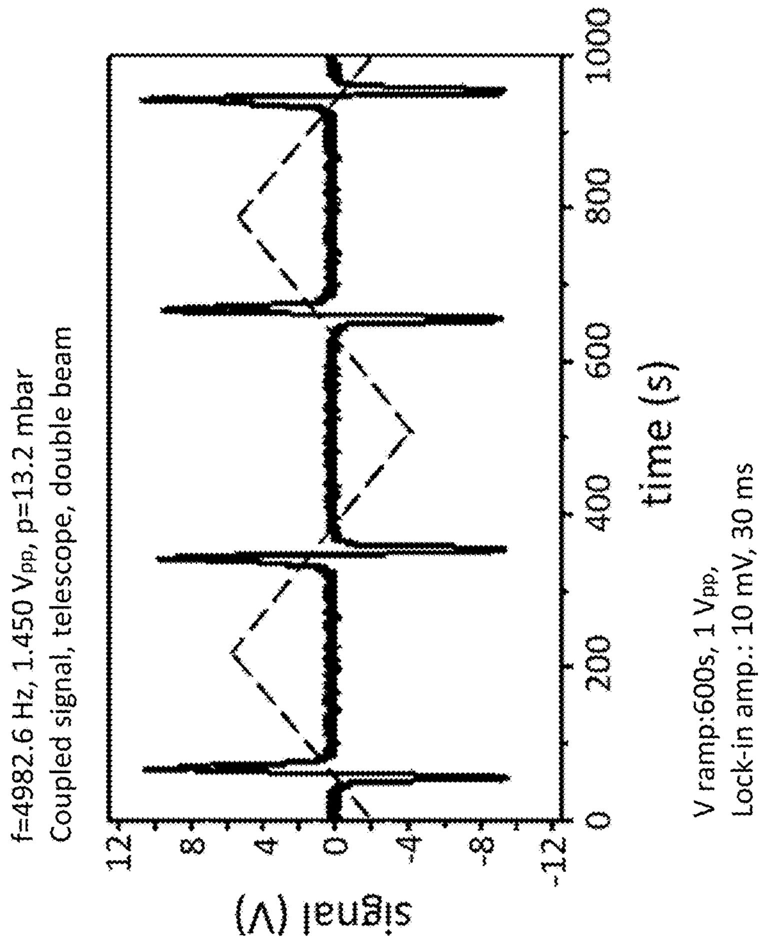
FIGS. 16 and 17 are graphs showing a comparison between a measurement (FIG. 16) performed not according to the invention and a measurement (FIG. 17) performed according to the invention.
Figure 16:
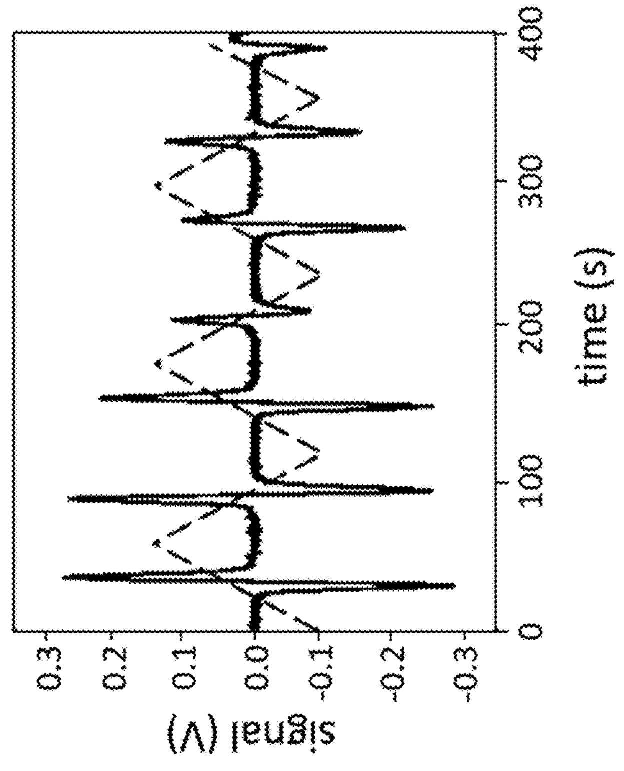

Example of repeated measurements in standard unlocked (FIG. 16) and locked (FIG. 17) conditions are reported. The dashed lines represent the triangular ramp spanning the laser frequency of the excitation laser beam over the molecular transition of the gas of interest. This comparison shows the benefit of the locking condition in terms of stability of the signal amplitude over repeated measurements. The strong variation of the signal amplitude over repeated acquisitions in standard unlocked operation (FIG. 16), which also invalidates the calibration, is corrected by the locking condition (FIG. 17).

EXAMPLE 2

QCL operating in the same conditions as in example 1. The cell is closed at a gas pressure of 15 mbar. For these measurements, too, the third-order mechanical resonance has been chosen. The locking point of the Michelson is, again, set to zero (differential signal).

Figure 18:
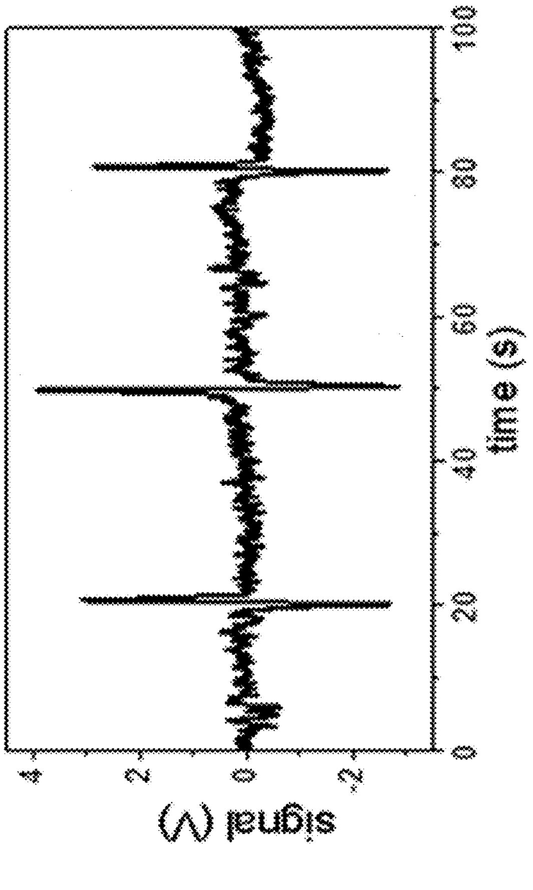
FIGS. 18 and 19 are graphs showing a comparison between a further measurement (FIG. 18) performed not according to the invention and a further measurement (FIG. 19) performed according to the invention.
Figure 19:
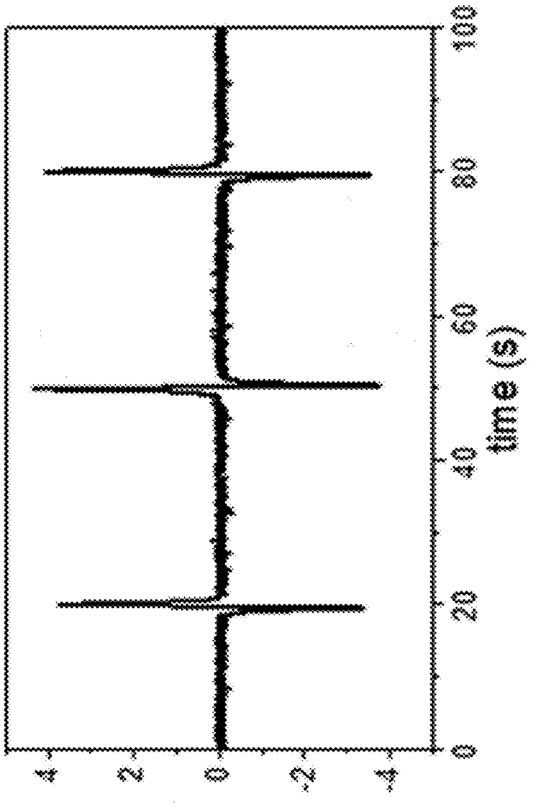

Demonstrative comparison between repeated measurements in standard unlocked (FIG. 18) and locked (FIG. 19) conditions. The signal-to-noise ratio over a single acquisition of the graph in FIG. 18 is 40, to be compared of the signal-to-noise ratio equal to 180 for a single acquisition of the graph of FIG. 19.

EXAMPLE 3

Figure 20:
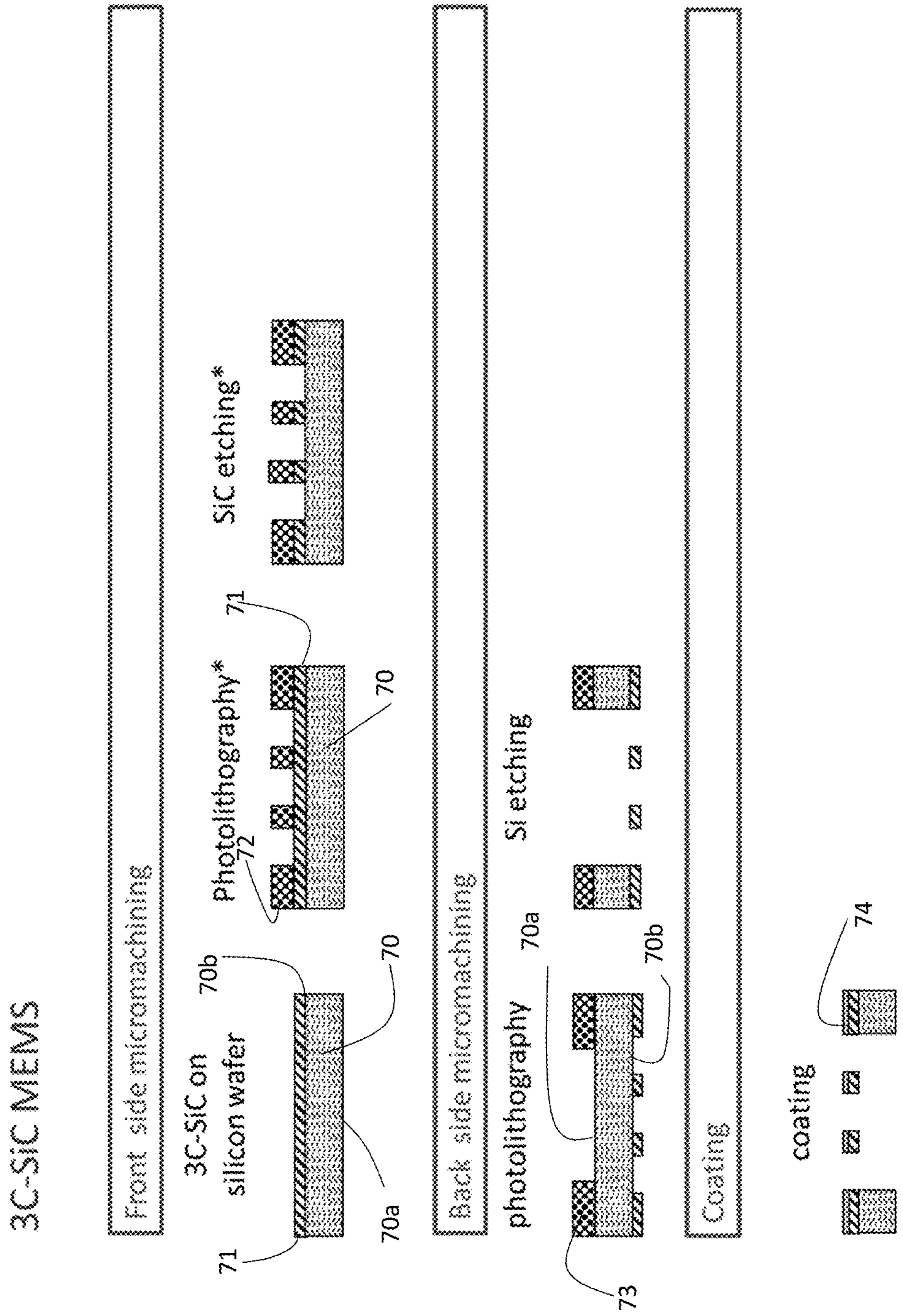
FIG. 20 shows a series of steps of the method of forming a transducer in heteroepitaxial 3C—SiC according to the invention.
Figure 21:
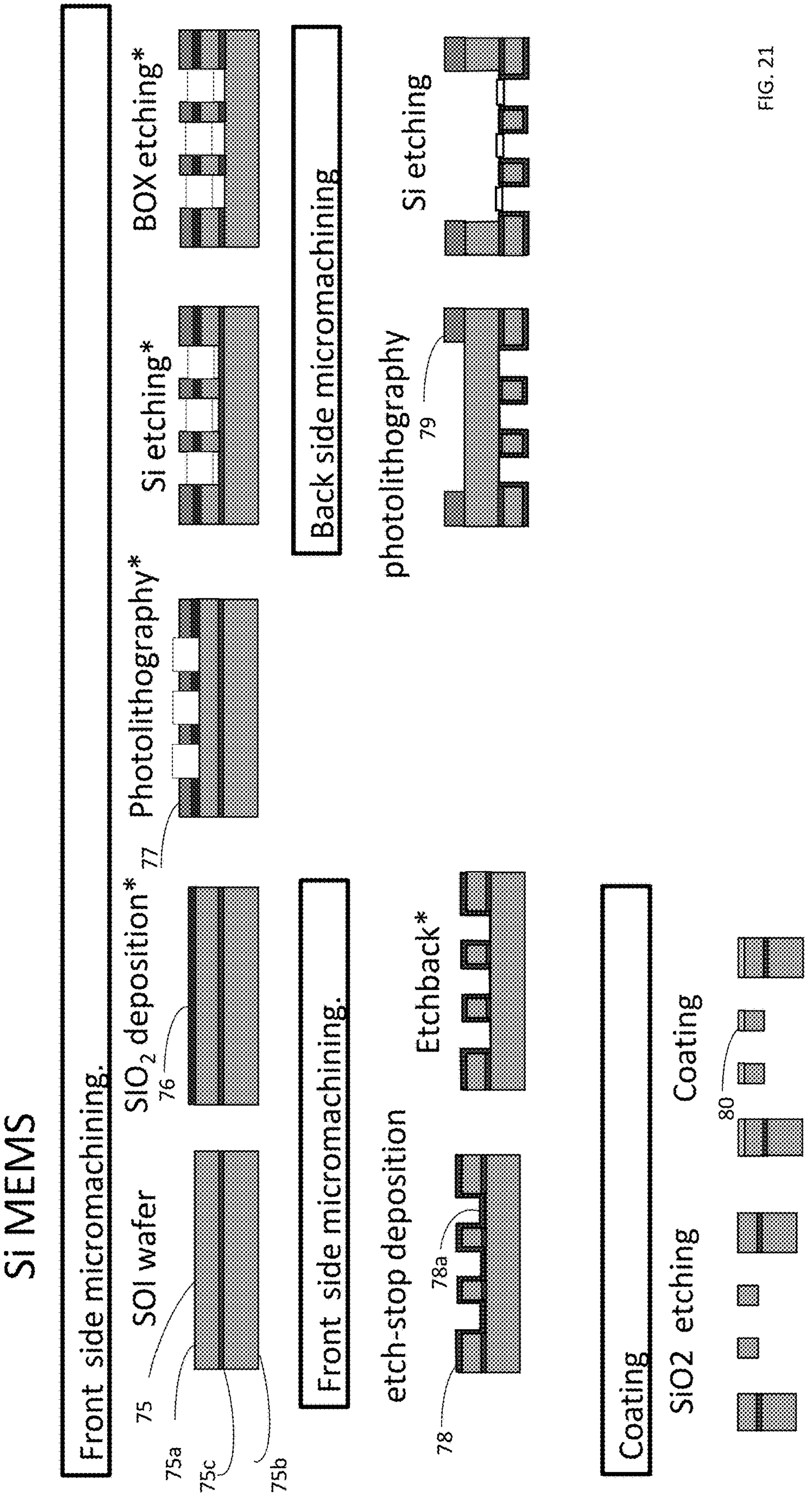
FIG. 21 shows a series of steps of the method of forming a transducer in silicon according to the invention.

The transducer 6 may be realized in the 3C-polytype of silicon carbide heteroepitaxially grown on a silicon wafer by using the method of FIG. 20.

An heteroepitaxial layer of 3C—SiC 71 grown on a wafer 70 of silicon that has two surfaces 70*a* and 70*b*. The surface 70*a* is made up of Si and the surface 70*b* is made up of 3C—SiC. The surface 70*b* is etched through a mask prepared via photolithography using a suitable photoresist 72 to give the desired shape to the SiC layer. The Si surface 70*a* is etched through a mask 73. The remaining portions of the silicon carbide 70*b* are then covered by a reflective coating 74 so that the transducer 6 has a reflective surface.

The SiC 70*b* surface can be etched in a plasma of $CHF_3$ and $O_2$; the silicon surface 70*a* can be anisotropically etched via dry etching using the standard silicon etching chemistry (e.g. fluorine- and chlorine-based gas mixtures); silicon can be anisotropically etched via wet etching, e.g. TMAH, KOH, NaOH solutions.

The steps marked with a star are not performed in the fabrication of a membrane.

EXAMPLE 4

A silicon on insulator (SOI) wafer (75) has two surfaces: 75*a* is made up of a thin silicon device layer on a buried $SiO_2$ layer (75*c*); 70 *b* is a several hundred-micron thick silicon handle substrate. A $SiO_2$ layer 76 is deposited on top of the surface 75*a*. The $SiO_2$ layer 76, the surface 75*a* and the buried $SiO_2$ layer 75*c* are etched through a suitable photoresist mask layer 77. A conformal $SiO_2$ layer 78 is deposited to cover the surface and the vertical walls of the device layer 75*a*, and the top surface of the handle substrate 75*b*. The layer in the groves/on the top on the handle surface is 78*a*. A dry etching is performed in order to remove the layer from 78*a*. The remaining $SiO_2$ is the etch stop for the etching of the handle substrate from the back side 75*b*. The handle 75*b* is etched via photolithography through a suitable photoresist 79. The remaining etch stop layer 78 and buried $SiO_2$ layer 75*c* are wet etched. The MEMS surface 75*a* is coated by a suitable metal layer.

The silicon layer 75*a* and 75*b* can be etched via a Bosch process reactive ion etching. The Si handle 75*c* can be either etched via wet etching in TMAH, KOH or NaOH. The $SiO_2$ 75*c*, 76, and 78 can be etched by wet etching in HF or by dry etching in a fluorine-based (e.g. $SF_6$, $CHF_3$) gas mixture.

The steps marked with a star are not performed in the fabrication of a membrane.

The invention claimed is:

1. A photoacoustic sensor for spectroscopic gas detection, comprising:

a chamber adapted to contain the gas to be analyzed;

an excitation laser source adapted to emit a modulated laser beam, which is absorbed by the gas present in the chamber and creating a pressure wave;

a transducer, the transducer being located inside the chamber, and being adapted to be put into oscillations by the pressure wave, the transducer having a reflective portion;

an interferometer having a first and a second arm and an output, with the first arm ending in the transducer, and the second arm including an optical path changer element and an actuator connected to the optical path changer element to change the optical path defined by the second arm of the interferometer;

a first polarizing beam splitter;

a second laser source for interferometer reading, adapted to emit a second laser beam impinging onto the first polarizing beam splitter, the first polarizing beam splitter being adapted to split the second laser beam in the first and the second arm of the interferometer, so that the split beam travelling in the first arm is back-reflected by the reflective portion of the transducer, and the split beam travelling in the second arm is back-reflected by the optical path changer element, so that the resulting back-reflected split beams interfere in the interferometer;

a second polarizing beam splitter adapted to split the interfering light at the output of the interferometer in two beams which are orthogonally polarized;

a first detector adapted to detect one of the two orthogonally polarized beam exiting the interferometer and to emit a corresponding first interference signal;

a second detector adapted to detect the other of the two orthogonally polarized beam exiting the interferometer and to emit a corresponding second interference signal;

an electronic circuit configured to obtain a difference signal, the difference signal being function of the difference between the interference signal emitted by the first detector and the interference signal emitted by the second detector;

a feedback loop adapted to command the movements of the actuator in order to change the optical path of the second arm, so that the difference signal is kept equal to a desired constant value during the gas concentration measurements.

2. The sensor according to claim 1, wherein the transducer is realized in one of Silicon, SiC, $SiO_2$, $Si_3N_4$, including amorphous or crystalline forms thereof or in non-stoichiometric forms, and polymers wherein the transducer is coatable by at least one of: a metal, a metal oxide, or a dielectric multilayer.

3. The sensor according to claim 1, wherein the transducer comprises a main component having a reflective element with at least a reflective portion, and a damping and insulation structure located between the chamber and the main component, the main component being connected to the chamber only via the damping and insulation structure.

4. The sensor according to claim 1, wherein the desired constant value is equal to zero.

5. The sensor according to claim 1, wherein the dimension of the transducer ranges from 10 μm to 2 cm.

6. A method to detect a gas concentration by means of a photoacoustic phenomenon, the method comprising:

providing a chamber where a gas is located, the concentration of which is to be measured;

providing a transducer in the chamber, the transducer comprising a reflective portion;

generating a pressure wave in the chamber by means of a modulated excitation laser beam directed into the chamber, according to the photo-acoustic phenomenon, the pressure wave putting the transducer in oscillation;

impinging with a second laser beam onto the reflective portion of the transducer;

providing an interferometer, having a first arm terminating into the transducer and a second arm terminating into an optical path changer element adapted to vary the path length of the second arm;

directing a second laser beam towards the interferometer, the second laser beam forming a first back-reflected beam when reflected by the transducer and a second back reflected beam when reflected by the optical path changer element;

creating an interference between the first and the second back-reflected beams;

splitting the interfering back-reflected beams in a first and a second interference beam;

polarizing the first and/or the second interference beam so that their polarization axes are mutually perpendicular;

detecting the first interference beam and the second interference beam generating a first and a second signal;

generating a difference signal function of the difference between the first signal and the second signal;

defining a working point value of the difference signal;

defining the optical path length of the second arm by actuating the actuator so that the difference signal is kept equal to the working point value during the gas concentration measurement.

7. The method according to claim 6, further comprising:

putting the transducer into oscillation at a frequency equal to the resonance frequency of the transducer or to a higher-order resonance.

8. The method according to claim 6, further comprising:

putting the transducer into oscillation at a frequency out of any resonance frequencies of the transducer.

9. The method according to claim 6, further comprising:

obtaining the gas concentration from the detecting of the first interference beam or from the detecting of the second interference beam if the frequency of the movements of the optical path changer element is much slower than modulation frequency of the excitation laser.

10. The method according to claim 6, further comprising:

sending a signal to the optical path changer element so that the difference signal is kept equal to the working point value;

obtaining the gas concentration from the signal sent to the optical path changer element if the frequency of the movements of the optical path changer element is of the same order of magnitude of the modulation frequency of the excitation laser.

11. The method according to claim 6, wherein impinging with a modulated excitation laser beam comprises:

operating an excitation laser at a given current and temperature, adding a fast modulation at a given frequency to the driving current and, adding a slow modulation, with a frequency much slower than the given frequency, to the current in order to scan the excitation laser optical frequency across the molecular transition.

* * * * *